United States Patent Office 3,658,757
Patented Apr. 25, 1972

3,658,757
PROCESS FOR THE PREPARATION OF POLY-
ESTERS FROM BISPHENOLIC COMPOUNDS
AND AROMATIC SULFONIC ACIDS
André Jan Conix, Antwerp, and Urbain Leopold Laridon,
Wilrijk, Belgium, assignors to Gevaert Photo-Producten
N.V., Mortsel, Belgium
No Drawing. Application Feb. 24, 1965, Ser. No. 435,079,
which is a continuation of application Ser. No. 62,076,
Oct. 12, 1960, which in turn is a continuation-in-part
of application Ser. No. 797,587, Mar. 6, 1959. Divided
and this application Jan. 16, 1970, Ser. No. 3,503
Claims priority, application Belgium, Mar. 7, 1958,
37,910/58; Dec. 22, 1959, 39,450/59; Great Britain,
Jan. 6, 1960, 543/60
The portion of the term of the patent subsequent to
Apr. 7, 1987, has been disclaimed
Int. Cl. C08g 17/08, 17/13
U.S. Cl. 260—49                             5 Claims

ABSTRACT OF THE DISCLOSURE

The present invention is concerned with the production of high molecular weight linear aromatic polyesters by reacting aromatic sulfonic acids with bis-phenolic compounds in the presence of a catalyst of the group consisting of a quaternary ammonium compound, a quaternary arsonium compound, a quaternary phosphonium compound and a tertiary sulfonium compound.

---

The present invention is concerned with the production of high-molecular weight linear aromatic polyesters, more particularly with the production of high-molecular weight linear aromatic polysulfonates and with a process and catalysts for their preparation.

The present application is a division of application Ser. No. 435,079 filed Feb. 24, 1965, and now U.S. Pat. No. 3,505,289, which is a continuation of our application Ser. No. 62,076, filed Oct. 12, 1960, now abandoned, which on its turn is a continuation-in-part of our application Ser. No. 797,587, filed Mar. 6, 1959, now abandoned.

In U.S. Pat. 2,035,578 there are described polysulfonates obtained from polysulfonic acids and polyhydric phenols, but it is stated that these resins are not so valuable as those prepared from polycarboxylic acids. They are frequently darker in color, have poorer water resistance and poorer solubilities.

It is an object of the present invention to provide a process for obtaining very high-molecular weight linear aromatic polysulfonates.

A further object of the invention is to procure aromatic polysulfonates with improved solubility properties in organic solvents and having a very high water resistance.

A still further object is to provide catalysts allowing the preparation of polymers having especially high-molecular weights and making it possible to carry out the reaction at room temperature and at atmospheric pressure.

Still further objects will appear from the following description and claims.

According to the present invention, highly polymeric linear aromatic polysulfonates are prepared by condensation of one or more diacid halides of aromatic disulfonic acids, dissolved or dispersed in an organic liquid which is a solvent or a swelling agent for the polysulfonate to be formed and which is immiscible with water, with an aqueous solution of one or more alkali diphenates.

Also according to the invention, highly polymeric linear aromatic polysulfonates are obtained by replacing in the above described polycondensation reaction, the diacid halides of aromatic disulfonic acids by a mixture of one or more diacid halides of aromatic disulfonic acids and one or more diacid halides of dicarboxylic acids.

This mixture may also be in part or wholly replaced by one or more diacid halides of aromatic monocarboxysulfonic acids.

Further, according to the invention, the polycondensation of alkali diphenates with the diacid halide is carried out in the presence as catalysts of one or more onium compounds such as quaternary ammonium compounds. These catalysts are preferably added in amounts between 0.01 and 5%, calculated on the weight of the diphenate or diphenates used. The most effective catalysts are soluble in the aqueous phase as well as in the organic phase and may be added to the reaction mixture before, during or after mixing of the two phases.

The polycondensation reaction may be carried out at temperatures between —10° C. and the boiling point of the organic solvent used. If a diacid halide is employed which is sensitive to hydrolysis, it is desirable to cool the reaction mixture to 0° C. or even lower so as to avoid this hydrolysis as much as possible.

Water is used as the solvent for the alkali diphenates and halogenated hydrocarbons, such as e.g. methylene chloride, chloroform, 1,2 - dichloroethane, 1,1,2 - trichloroethane, sym-tetrachloroethane, methylchloroform, etc., are employed as common solvent for the diacid halide and the polyester to be formed by the reaction. Other water-immiscible organic solvents such as benzene, toluene, etc. can be used in association with the above mentioned solvents.

The highly linear polyesters of the present invention have an intrinsic viscosity of at least 0.4 and in most cases above 0.6 when measured in a solution of sym-tetrachloroethane at 25° C. and contain recurring groups of the following general formula

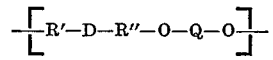

wherein D and Q each represents a divalent radical selected from the group consisting of -arylene-, -arylene-arylene-, -arylene-R-arylene- and cycloalkylidene; R" is an —SO₂— radical and R' is selected from the group consisting of —SO₂— and

radicals, and wherein R represents a divalent radical selected from the group consisting of ether radical, tertiary amino radical, carbonyl radical, thio radical, sulfoxide radical, sulfone radical, alkylene group, alkylidene group, alkyl substituted alkylene group, aryl substituted alkylene group, halogen substituted alkylene group, haloalkyl substituted alkylene group, alkyl and aryl substituted alkylene group, cycloalkylidene group, two alkylene groups bonded together by a radical selected from the group consisting of aryl, tertiary amino radical, ether radical, carbonyl radical, thio radical, sulfoxide radical and sulfone radical.

According to a preferred embodiment arylene is selected from the group consisting of phenylene and naphthylene including organic substituents therein selected from the group consisting of halogen and alkyl.

In the case where the highly linear polyesters are copolyesters, the structural units can be represented by the following general formula

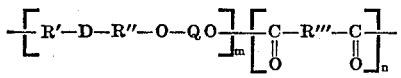

wherein D, Q, R' and R" have the same significance as above, wherein R''' represents a radical taken from an organic dicarboxylic acid and $m$ and $n$ are whole numbers.

When in the manufacture of the polyesters according to the invention phosgene or thiophosgene is used together with a diacid halide of disulphonic or sulphocarboxylic acid the copolyesters contain structural units of the following general formula

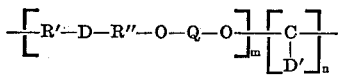

wherein D, Q, R' and R" have the same significance as above and wherein D' is taken from the group consisting of oxygen and sulfur and $m$ and $n$ are whole numbers.

In the polycondensation reaction according to the invention alkali diphenates are used which are obtained by dissolving diphenols in water in the presence of equivalent amounts of alkali hydroxides such as sodium- or potassium hydroxides. The term diphenols is intended to refer to compositions of the general formula

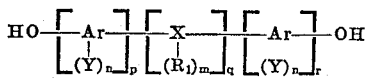

Herein Ar represents an aromatic group such as phenylene, biphenylene, naphthylene, etc. X can be an alkylene or an alkylidene group such as methylene, ethylene, propylene, ethylidene, propylidene, isopropylidene etc. X can also be one or more alkylene or alkylidene groups bonded together by an aromatic radical, by a tertiary amino radical, by an ether radical, by a carbonyl radical, by a radical containing sulfur such as a sulfide, a sulfoxide, a sulfone radical etc. Moreover X can be a cycloaliphatic group, or a radical containing sulfur, such as a sulfide (—S—), a sulfoxide (—SO—) or a sulfone (—SO$_2$—) group, an ether radical (—O—), a carbonyl radical (—CO—), or a tertiary amino radical (—N(Alk)—).

In the formula $R_1$ represents hydrogen, alkyl (methyl, ethyl etc.), aryl (phenyl, naphthyl etc.), aralkyl (benzyl, ethylphenyl etc.), alkaryl or a cycloaliphatic radical, and all these radicals can be substituted by halogen. Y represents halogen, a substituent such as nitro, a radical OR$_2$, a radical R$_2$ wherein R$_2$ has the same significance as R$_1$ above; $n$ and $m$ which are the same or different integers may vary from 0 to the number of unsubstituted carbons on Ar or on X; $p$ is an integer at least equal to 1; $q$ is 0 or 1 and $r$ is an integer which may be 0 if $q$ also is 0.

If in the diphenols according to the formula, more than one substituent Y is present, the substituents may be the same or different. The foregoing remark is also applicable to the substituent $R_1$.

When $q$ is nought and $r$ different from nought, the aromatic nuclei are directly bonded to each other.

The hydroxyl groups and the substituents Y of the aromatic nuclei may occur in the ortho-, meta- or para-positions.

The following compounds are examples of diphenols the alkali diphenates of which can be used for preparing polysulfonates according to the invention:

bis-(4-hydroxyphenyl)-methane
bis-(4-hydroxy-3-methylphenyl)-methane
bis-(4-hydroxy-3,5-dichlorophenyl)-methane
bis-(4-hydroxy-3,5-dibromophenyl)-methane
bis-(4-hydroxy-3,5-difluorophenyl)-methane
bis-(4-hydroxyphenyl)-ketone
bis-(4-hydroxyphenyl)-sulfide
bis-(4-hydroxyphenyl)-sulfone
bis-(4-hydroxyphenyl)-ether
1,1-bis-(4-hydroxyphenyl)-ethane
2,2-bis-(4-hydroxyphenyl)-propane
2,2-bis-(4-hydroxyphenyl)-butane
2,2-bis-(4-hydroxyphenyl)-(4-methyl)-pentane
2,2-bis-(4-hydroxy-3-methylphenyl)-propane
2,2-bis-(4-hydroxy-3-chlorophenyl)-propane
2,2-bis-(4-hydroxy-3,5-dichlorophenyl)-propane
2,2-bis-(4-hydroxy-3,5-dibromophenyl)-propane
2,2-bis-(4-hydroxynaphthyl)-propane
bis-(4-hydroxyphenyl)-phenylmethane
bis-(4-hydroxyphenyl)-phenylmethylmethane
bis-(4-hydroxyphenyl)-diphenylmethane
bis-(4-hydroxyphenyl)-(4-methylphenyl)-methane
1,1-bis-(4-hydroxyphenyl)-2,2,2-trichloroethane
bis-(4-hydroxyphenyl)-(4-chlorophenyl)-methane
1,1-bis-(4-hydroxyphenyl)-cyclohexane
1,1-bis-(4-hydroxyphenyl)-(3-methylphenyl)-propane
bis-(4-hydroxyphenyl)-cyclohexylmethane
4,4'-dihydroxydiphenyl
2,2'-dihydroxydiphenyl
dihydroxynaphthalenes such as 2,6-dihydroxynaphthalene
hydroquinone
resorcinol
2,6-dihydroxytoluene
2,6-dihydroxychlorobenzene
3,6-dihydroxytoluene, etc.

The diacid halides of the invention can be obtained e.g. by reaction of the respective aromatic disulfonic acids or dicarboxylic acids with thionyl chloride.

The term diacid halides of aromatic disulfonic acids is intended to refer to compositions of the general formula:

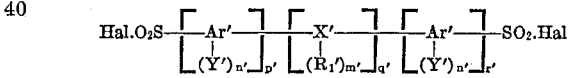

wherein Hal stands for halogen such as chlorine or bromine and wherein the symbols Ar', X', Y', R'$_1$, n', m', p', q', r' have the same significance respectively as Ar, X, Y, R$_1$, n, m, p, q, r above.

As aromatic disulfohalides which can be used in the polycondensation reaction according to the invention are mentioned among others the following disulfochlorides:

1,4-benzene-disulfochloride
1,3-benzene-disulfochloride
1,2-benzene-disulfochloride
2,4-toluene-disulfochloride
2,7-naphthalene-disulfochloride
4,4'-diphenyl-disulfochloride
4,4'-diphenylether-disulfochloride
4,4'-diphenylmethane-disulfochloride
4,4'-diphenylsulfone-disulfochloride
3,3'-diphenylsulfone-disulfochloride
2,2-bis-(4-chlorosulfonylbenzyl)-propane
4,5-dichloro-1,3-benzene-disulfochloride
4,6-dichloro-1,3-benzene-disulfochloride
4,5,6-trichloro-1,3-benzene-disulfochloride.

As is said above the diacid halides of aromatic dicarboxylic acids may be partly replaced by one or more diacid halides of dicarboxylic acids.

As diacid halides of dicarboxylic acids there can be used phosgene, thiophosgene and diacid halides of the general formula:

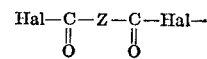

wherein Hal represents chlorine or bromine and wherein Z represents one of the following radicals:

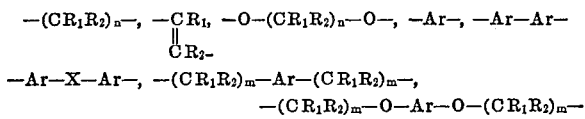

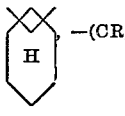, 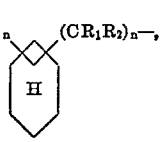,

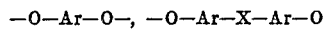
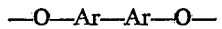
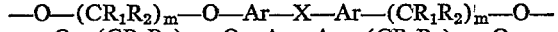
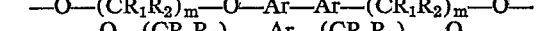
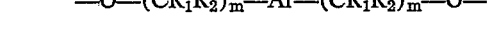

In this list of possible Z radicals the symbols have the following significance:

Ar is an arylene radical such as a phenylene or naphthylene radical, substituted (in ortho-, meta- or para-position) or not by alkyl or halogen;

$R_1$ and $R_2$ are hydrogen, alkyl or aryl;

X is one of the following radicals: $-CZ_1Z_2-$, $-CO-$, $-O-$, $-S-$, $-SO-$, $-SO_2-$ wherein $Z_1$ and $Z_2$ which are the same or different are hydrogen, alkyl, aryl or wherein $Z_1$ and $Z_2$ form together a cyclo-aliphatic ring;

$n$ is an integer from 1 to 20 and
$m$ is 1 or 2.

The symbol

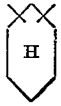

indicates hydrogenation, either wholly or in part of an aromatic nucleus, of which the free bonds are in the 1,1-, 1,2-, 1,3- or 1,4-position.

As diacid halides of dicarboxylic acids which may be used according to the invention we mention among others the following diacid chlorides:

phosgene
thiophosgene
terephthaloylchloride
isophthaloylchloride
phthaloylchloride
sebacoylchloride
adipoylchloride
4,4'-diphenylether dicarboxylic acid chloride
(4,4'-dihydroxydiphenyl-2,2-propane)-bischloroformate
ethyleneglycolbischloroformate.

The diacid halides of aromatic disulfonic acids or of dicarboxylic acids may be, either in part or wholly, replaced by one or more diacid halides of aromatic monocarboxysulfonic acids of the general formula:

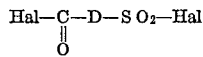

wherein Hal represents halogen such as chlorine and bromine, and wherein D represents an arylene group such as phenylene or naphthylene, or phenylene or naphthylene of which one or more of the hydrogen atoms of the aromatic nuclei have been substituted by at least one radical of the group consisting of alkyl and halogen.

As diacid halides of aromatic mono-carboxysulfonic acids we especially mention among others:

benzoylchloride-m-sulfochloride
benzoylchloride-p-sulfochloride
benzoylchloride-o-sulfochloride, and
1,2-sulfonaphthoic acid.

According to the process of the invention the polycondensation of diphenates and diacid halides is carried out in the presence as catalysts of minor amounts of one or more compounds selected from the group consisting of quaternary ammonium compounds, tertiary sulfonium compounds, quaternary phosphonium compounds and quaternary arsonium compounds.

As quaternary ammonium compounds we mention among others:

trimethylbenzylammoniumchloride
triethylbenzylammoniumhydroxide
triethylbenzylammoniumchloride.

Examples of convenient tertiary sulfonium compounds are among others:

S,S'-p-xylene-bis-(dihydroxyethylsulfoniumbromide)
hexamethylene-S,S'-bis-dimethyl-1,6-disulfoniumbromide
tribenzylsulfonium hydrogensulfate.

In principle, any quaternary phosphonium compound can be used as catalyst; preferably, however, those which are soluble in water and/or in the organic solvent wherein the polycondensation is carried out. Specific quaternary phosphonium compounds which can be used are e.g.:

triphenylmethylphosphonium iodide
triphenylbenzylphosphonium chloride
p-xylylene-bis-(triphenylphosphoniumchloride)
p-xylylene-bis-(triethylphosphoniumbromide)
tetraethylphosphoniumbromide
triethyloctadecylphosphoniumiodide
phenylethylpentamethylene phosphonium acetate
bis-(triethylphosphoniumacetate)-1,4-butane and many others e.g. those mentioned in the book by Kosolapoff entitled: "Organophosphorous Compounds" (John Wiley and Sons, New York, 1950), pp. 86–94.

Suitable quaternary arsonium compounds are e.g. found in the publications of A. Michaelis, Ann. Chem. 321, 141–248 (1902); and F. F. Blicke et al., J.A.C.S. 60, 421 (1938), 61, 89 (1939) and 63, 1493 (1941).

We mention among others:

triphenylmethylarsoniumiodide
triphenylmethylarsoniumhydroxide
triphenylethylarsoniumiodide
triphenylhydroxyethylarsoniumchloride.

Due to the fact that the polysulfonates of the invention are thermoplastic, they can be worked up from the melt into useful shaped articles by applying fabrication techniques known in the art such as pressing, moulding or vacuum-forming.

It is a further advantage of the present invention that it provides for highly polymeric linear polysulfonates which are insoluble in low boiling solvents. Depending upon the special chemical structure of each of the polysulfonates involved, they are soluble in at least one halogenated hydrocarbon such as methylene chloride, chloroform, 1,2-dichloroethane, symtetrachloroethane, methylchloroform, 1,1,2-trichloroethane, etc. Most of the polysulfonates according to the invention, however, are soluble in more than one of the above-mentioned halogenated hydrocarbons, and are moreover soluble in other solvents such as benzene, toluene, dioxane, tetrahydrofurane, etc.

From solution in methylene chloride or sym-tetrachloroethane the polysulfonates can be cast into colorless transparent films. The values of the mechanical properties are situated between the following ranges according to the particular chemical structure:

Tensile strength, kg./sq. mm. _____ 6–9
Yield strength, kg./sq. mm. _____ 5–7
Elongation at break, percent _____ 2–6
Modulus of elasticity, kg./sq. mm. _____ 240–320

Upon stretching the films, the mechanical properties can be greatly enhanced. Noteworthy is the elongation at break which after stretching reaches values as high as 100%.

Softening temperatures of polysulfonate films were determined by measuring as a function of temperature the elongation of film strips of fixed dimensions subjected to a constant load of 0.17 kg./sq. mm. The temperature range where an appreciable rise in elongation of the films is observed, is indicated in the tables as the softening point. It must be emphasized that these temperatures have only a comparative value since they are more or less dependent on the method of measurement. However, they are indicative of the glass transition temperature of the polymer, which is situated in the same temperature range. This has been verified for instance in the case of polymer 18 (see following table) where a glass transition temperature of 112° has been determined dilatometrically while for the softening point a range of 115–116° is noted.

In the following table there are assembled the softening point, the solubility and the intrinsic viscosity [η] of a series of representative polysulfonates.

| No. | | Softening temp., °C. | Solubility [1] | Viscosity [2] |
|---|---|---|---|---|
| | Poly-4,4'-diphenyldisulfonate from— | | | |
| 1 | Bis-(4-hydroxyphenyl)-methane | 111–118 | D | 0.40 |
| 2 | 1,1-bis-(4-hydroxyphenyl)-ethane | 109–111 | D | 1.1 |
| 3 | 2,2-bis-(4-hydroxyphenyl)-propane | 160–165 | A–E | 0.5–2.7 |
| 4 | 2,2-bis-(4-hydroxyphenyl)-butane | 134–140 | A–E | 1.6 |
| 5 | 2,2-bis-(4-hydroxyphenyl)-(4-methyl)-pentane | 147–150 | A–E | 0.50 |
| 6 | 1,1-bis-(4-hydroxyphenyl)-cyclohexane | 108–112 | A | 1.1–1.6 |
| 7 | Bis-(4-hydroxyphenyl)-phenylmethane | 155–160 | A–E | 1.5 |
| 8 | Bis-(4-hydroxyphenyl)-phenylmethylmethane | 162–169 | A–E | 1.0 |
| 9 | Bis-(4-hydroxyphenyl)-sulfone | | D | 0.30 |
| 10 | Bis-(4-hydroxy-3-methylphenyl)-methane | 114–120 | D | 0.6 |
| 11 | 2,2-bis-(4-hydroxy-3-methylphenyl)-propane | 132–136 | A–E | 1.4 |
| 12 | 1,1-bis-(4-hydroxy-3-methylphenyl)-cyclohexane | 146–151 | A–E | 1.4 |
| 13 | 2,2-bis-(4-hydroxy-3,5-dichlorophenyl)-propane | 197–200 | A–E | 1.7 |
| 14 | 2,2-bis-(4-hydroxy-3,5-dibromophenyl)-propane | 200–207 | A–E | 1.7 |
| | Poly-4,4'-diphenyletherdisulfonate from— | | | |
| 15 | Bis-(4-hydroxyphenyl)-methane | 97–100 | A–E | 0.80 |
| 16 | 1,1-bis-(4-hydroxyphenyl)-ethane | 100–107 | A–E | 0.40 |
| 17 | 2,2-bis-(4-hydroxyphenyl)-propane | 118–120 | A–E | 1.0 |
| 18 | 2,2-bis-(4-hydroxyphenyl)-butane | 111–116 | A–E | 0.70 |
| 19 | 2,2-bis-(4-hydroxyphenyl)-pentane | 106–111 | A–E | 0.70 |
| 20 | 1,1-bis-(4-hydroxyphenyl)-cyclohexane | 120–125 | A–E | 1.2 |
| 21 | Bis-(4-hydroxyphenyl)-phenylmethane | 116–120 | A–E | 0.70 |
| 22 | Bis-(4-hydroxyphenyl)-phenylmethylmethane | 130–138 | A–E | 1.6 |
| 23 | Bis-(4-hydroxyphenyl)-diphenylmethane | 126–131 | A–E | 0.50 |
| 24 | Bis-(4-hydroxyphenyl)-sulfone | 140–142 | A–E | 0.60 |
| 25 | 2,2-bis-(4-hydroxy-3-methylphenyl)-propane | 72–78 | A–E | 0.70 |
| 26 | 2,2-bis-(4-hydroxy-3,5-dichlorophenyl)-propane | 142–151 | A–E | 2.5 |
| 27 | 2,2-bis-(4-hydroxy-3,5-dibromophenyl)-propane | 156–164 | A–E | 1.05 |
| | Poly-4,4'-diphenylmethanedisulfonate from— | | | |
| 28 | Bis-(4-hydroxyphenyl)-methane | 110–114 | A–E | 1.5 |
| 29 | 1,1-bis-(4-hydroxyphenyl)-ethane | | D | 1.3 |
| 30 | 2,2-bis-(4-hydroxyphenyl)-propane | 114–116 | A–E | 0.75 |
| 31 | 2,2-bis-(4-hydroxyphenyl)-butane | 111–115 | A–E | 0.75 |
| 32 | 3,3-bis-(4-hydroxyphenyl)-pentane | 100–104 | A–E | 0.7 |
| 33 | 1,1-bis-(4-hydroxyphenyl)-cyclohexane | 82–94 | A–E | 0.4 |
| 34 | Bis-(4-hydroxyphenyl)-phenylmethane | 133–134 | A–E | 0.95 |
| 35 | Bis-(4-hydroxyphenyl)-phenylmethyl-methane | 131–132 | A–E | 0.7 |
| 36 | Bis-(4-hydroxyphenyl)-sulfone | 126–130 | A–E | 0.30 |
| | Poly-2,4-toluenedisulfonate from— | | | |
| 37 | 2,2-bis-(4-hydroxyphenyl)-propane | 84 | A–E | 0.60 |
| 38 | Bis-(4-hydroxyphenyl)-phenylmethylmethane | 106–112 | A–E | 0.50 |
| 39 | 2,2-bis-(4-hydroxyphenyl-3,5-dichlorophenyl)-propane | 150–156 | A–E | 0.80 |
| 40 | 2,2-bis-(4-hydroxyphenyl-3,5-disbromophenyl)-propane | 170–173 | A–E | 0.80 |
| | Poly-1,3-benzenedisulfonate from— | | | |
| 41 | 2,2-bis-(4-hydroxyphenyl)-propane | 49 | A–E | 0.80 |
| 42 | 2,2-bis-(4-hydroxyphenyl-3,5-dichlorophenyl)-propane | 140–147 | A–E | 1.0 |
| 43 | 2,2-bis-(4-hydroxyphenyl-3,5-dibromophenyl)-propane | 149–152 | A–E | 0.80 |
| 44 | Poly-3,3'diphenylsulfonedisulfonate from— 2,2-bis-(4-hydroxyphenyl)-propane | 100–104 | A–E | 0.90 |

[1] A=methylenechloride; B=1,2-dichloroethane; C=1,2,2-trichloroethane; D=sym-tetrachloroethane; E=tetrahydrofurane.
[2] Intrinsic viscosity, dl./g. measured in sym-tetrachloroethane.

It is a particular advantage of the present invention that it provides for a polycondensation process according to which aromatic polysulfonates can be produced which possess an exceptionally high-molecular weight as indicated by their intrinsic viscosities ranging from 0.4 to 2.5 determined in dichloroethane or tetrachloroethane solution.

In this respect the aromatic polysulfonates produced according to the process of the present invention possess outstanding properties relative to the formerly proposed polysulfonates. From the polysulfonates produced according to the process of the present invention, moreover, films can be obtained which advantageously can be used for special purposes e.g. as photographic film-base, the polymers showing an intrinsic viscosity greater than 0.5 and in many cases greater than 1.

The films or fibers prepared from the polysulfonates according to the invention by casting them from solution in low boiling solvents or by extruding them from the melt need not necessarily be stretched and heat set in order to give them useful properties since the unstretched films show good mechanical properties. If desired, however, the strength of shaped articles such as films and fibers prepared from the polysulfonates of the invention can be increased by stretching the articles in one or more directions at room temperature or preferably at some higher temperature depending on the softening point of the particular polyester involved.

It is a particular advantage of our invention that it provides for polysulfonates from which films can be produced which possess a high dimensional stability when exposed to varying temperatures and varying humidities. These properties, which are to be ascribed to the high softening points and the low water-absorption of the polysulfonates make them particularly useful for the manufacture of dimensionally stable photographic film base. Dimensional stability is an important requirement for a film support on which light-sensitive emulsions etc., for graphic art work are to be coated.

A further advantage of the present invention is that it provides for polysulfonates which can be transformed from the melt or from solutions into fibers showing good textile properties.

It has further been found that the polysulfonates of the present invention possess very interesting electrical properties so that they can advantageously be used in electrophotographic materials.

The invention includes polysulfonates obtained by reacting a mixture of two or more of the specified diphenates with one or more of the specified diacid halides of aromatic disulphonic acids or mixtures of two or more of these diacid halides with one or more of the said diphenates.

The invention further includes polymers obtained by using a mixture of one or more of the above-mentioned bisphenates with diphenates such as e.g. those derived from hydroquinone, resorcinol, 4,4'-dihydroxydiphenyl, bis-(4-hydroxyphenyl)-sulfone, bis-(4 - hydroxyphenyl)-ketone etc., or by using a mixture of one or more of the above-mentioned diacid halides of aromatic disulfonic acids with diacid halides of dicarboxylic acid such as specified above.

The invention furthermore includes polysulfonates obtained by replacing the mixture of one or more diacid halides of aromatic disulfonic acids and of one or more diacid halides of dicarboxylic acids, either wholly or in part by one or more diacid halides of aromatic monocarboxy-sulfonic acids.

In the latter cases we are concerned with copolycarboxylatesulfonate polymers and we wish to point out the variety of final condensation products which can be obtained.

Moreover, there exist still further possibilities for causing the type of the copolycarboxylate-sulfonate to vary. In a random polycondensation, the structural units are spread in a statistical way over the polymer chain. By another method, however, a certain ordering in the sequence of the structural moieties in this polymer can be obtained. Instead of reacting the three reagents simultaneously, we can for instance start from a solution or dispersion in an organic solvent of the aromatic disulfochloride only. The polycondensation is carried out by addition of an aqueous solution of an alkali diphenate and of the catalyst.

After a more or less long time lapse the solution or dispersion of the dicarboxylic acid chloride is added to the reaction mixture and the polycondensation is further effected. In this case the so called block copolycondensates are obtained in which the structure is supposed to consist mainly of more or less long sequences of sulfonate moieties, followed by more or less long sequences of carboxylate moieties. In the same way, the dicarboxylic acid chloride can first be caused to react with the alkalidiphenate and only after a more or less long reaction time the aromatic disulfochloride can be added.

By starting from mixtures of the different reagents, the different blocks can, of course, be varied still further and consequently also the properties of the copolycondensate finally obtained can be varied.

In all these variants, the amounts of the different reagents must be chosen in such a way that the total amounts of acid chlorides, i.e. the amounts of sulfochloride together with the amounts of carboxylic acid chloride, correspond substantially stoichiometrically to the amounts of the bisphenols used. However, high molecular weight products can be obtained if a slight excess of acid chlorides or alkalibisphenates is present.

The properties of the copolycarboxylate-sulfonate obtained will, of course, depend to a large extent on the way in which the aqueous solution of the alkalibisphenate is added to the acid chloride solutions or dispersions. Generally it can be said that with a suitable choice of the molar proportions of the different reagents for the cocondensates the high weakening point of the pure polysulfonates is accompanied by a sufficiently high elongation at break. It follows that films cast from their solution are tough and do not show any tendency to craze. Stretching of these films, however, is a means of further improving the mechanical properties. The optimum properties of the non-stretched films evidently depend on the kind of the mutual proportions of the reagents used and the optimum composition can for each case be experimentally determined in an easy way.

The copolycarboxylate-sulfonates according to the present invention are in most cases soluble in chlorinated aliphatic and aromatic hydrocarbons and in some cases also in tetrahydrofurane and in dioxane.

The properties of films cast from solutions of copolycarboxylate-sulfonates, of course, depend on the chemical nature of the recurring moieties and of the relative proportion of carboxylate bonds (—CO—O—) and sulfonate bonds (—SO$_2$—O—) in the polymer chain. The proportion of the latter whereby the most desired mechanical properties are obtained can be experimentally determined in an easy way for each type of copolymer.

For example, for the copolycarboxylate-sulfonate prepared from bisphenol A and a mixture of 4,4'-diphenyldisulfochloride and bisphenol-A - bis - chloroformate, the molar proportion of disulfonic acid chloride and bischloroformate can be modified at the start of the reaction and the mechanical properties of the films can be determined for each copolymer thus obtained.

In the following table the properties of these copolymers are compared with those of the homopolymers. In the first column the molar proportion of the 4,4'-diphenyldisulfochloride to the 2,2-bis-(4-hydroxyphenyl)-propane bischloroformate used in the preparation is given. Since the polycondensation proceeds with a yield of about 100%, this molar proportion corresponds to the molar proportion in the polymer chain of the recurring moieties having the following chemical structure.

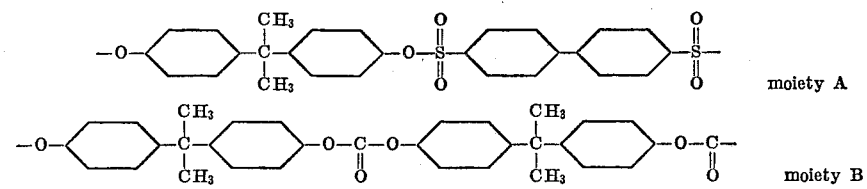

moiety A moiety B

TABLE 1

| Polymer No. | Molar proportion | | Tensile strength, kg./sq. mm. | Elasticity modulus, kg./sq. mm. | Elongation at break, percent | Softening temperature, °C. | Glass transition temperature, °C.[2] | Cold drawing |
| --- | --- | --- | --- | --- | --- | --- | --- | --- |
| | Moiety A | Moiety B | | | | | | |
| 1 | 100 | 0 | 7.5 | 270 | 5 | 160 | 165 | — |
| 2 | 80 | 20 | 7.0 | 250 | 10 | 150 | | + |
| 3 | 50 | 50 | 6.7 | 245 | 12 | 145 | 162 | + |
| 4 | 33 | 66 | 6.6 | 240 | 35 | 140 | | + |
| 5 | 20 | 80 | 6.5 | 230 | 6 | 140 | | + |
| 6 | 0 | 100 | 6.6 | 210 | 70 | 125 | 149 | + |

[1] The mechanical properties were determined on film strips of the following dimensions: length between clamps 50 mm., width 5 mm.
[2] The glass transition temperature has been determined by measuring the enthalpy of the polymer as a function of temperature.

It clearly appears from this table that the properties of the copolycondensates according to the present invention strongly depend on the molar proportion of the sulfonate bonds (—SO$_2$—O—) to the carboxylate bonds (—CO—O—) in the copolymer chain. We can also discern from this table that copolymer Nos. 2, 3 and 4 possess properties which for many applications are expressly to be preferred over the properties of polymers 1, 5 or 6. For example it is desirable for the application as photographic support to employ a polymer which can be fast from solution to flexible films which on rough handling do not show a tendency to craze. This unfavorable property only appears when the elongation at break in the copolymers cited is less than 6%. It is also printed out that the films showing the property which in the literature is called cold drawing do not show a tendency to craze by a rough handling of the film.

It is also printed out that Polymer No. 1 contrary to the others shows a brittle failure at room temperature while the others show a ductile failure. For the difference between the two types of break phenomena we refer to: Die Physik der Hochpolymeren von H. A. Stuart, Band IV, pp. 174–176, Springer-Verlag, Berlin 1956.

Once the film breaks with a ductile failure, there is for the application as a photographic support of graphic light-sensitive material little difference whether the elongation at break is very high or not; this means the polymers 2 to 6 possess about the same practical value if judged on their break phenomenon. For many application fields and in particular for application as a photographic support an elasticity modulus which is as high as possible is of great importance. A high elasticity modulus involves an increase of the dimentional stability of photographic films manufactured on dimensionally stable supports. Practically for all applications a high sheet softening temperature is of very great value. The higher this softening temperature, the better will be the dimensional stability of the sheets when the environmental temperature increases.

It further clearly appears from the table that glass transition temperature for the copolymer No. 3 (prepared according to Example 39) is practically as high as for the homopolysulfonate (polymer No. 1).

From all these data the favorable properties of the copolymers described in this invention are clearly shown. According to the uses for which the new copolymers are intended these improved properties can be employed to advantage.

The same consideration can be held for each series of copolymers described in the present invention. The above series was chosen as an example for denoting the exceptional properties of the copolymers.

EXAMPLE 1

18.35 g. of 4,4'-diphenylether-disulfochloride, 0.25 g. of triethylbenzyl ammonium chloride and 50 cc. of methylene chloride are successively brought into a three-necked half liter flask provided with a stirrer, a refluxer and a dropping funnel. While stirring at room temperature a solution of 11.4 g. of 2,2-bis(4-hydroxyphenyl)-propane and 99 cc. of sodium hydroxide 1.0267 N is dropwise added through the funnel within half an hour. The reaction mixture is further stirred for 2 hours whereupon the polymer separates as a very viscous mass. The supernatant water is decanted and the residue is washed for ¼ hour with 100 cc. of water while strongly stirring. The product is obtained by pouring out the viscous mass in hot water and drying at 100° C. Intrinsic viscosity measured in 1,2-dichloroethane: 1.0 dl./g. Softening point 110° C.

The polysulfonate obtained corresponds to the formula:

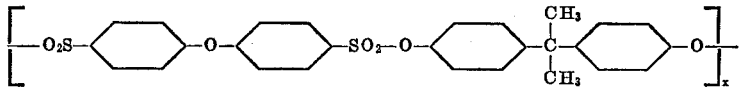

EXAMPLE 2

140.4 g. of 4,4'-diphenyl-diulfochloride, 4 g. of triethylbenzyl ammonium chloride and 800 cc. of methylene chloride are successively brought into a three-necked three liter flask provided with a stirrer, a refluxer, a thermometer and a dropping funnel. While stirring at a temperature of 20–25° C. a solution of 91.2 g. of 2,2-bis-(4-hydroxyphenyl)-propane, 32.5 g. of sodium hydroxide and 800 cc. of water is dropwise added through the funnel within ¼ of an hour. The reaction mixture is further stirred for 3 hours whereupon the polymer separates as a viscous mass. The supernatant water is decanted and the residue is washed for ¼ hour with 800 cc. of water whilst strongly stirring. The product is obtained by pouring out the viscous mass in hot water and drying at 100° C. Intrinsic viscosity of this polysulfonate measured in tetrachloroethane: 1.5 dl./g. Softening point: 150–160° C.

The polysulfonate obtained corresponds to the formula:

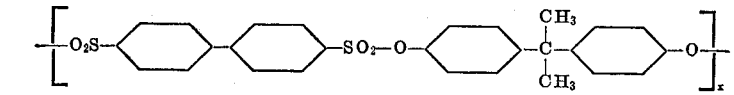

3.67 g. of 4,4'-diphenylether-disulfochloride, 0.05 g. of triethylbenzyl ammonium chloride and 12.5 cc. of methylene chloride are successively brought into a three-necked 100 cc. flask provided with a stirrer, a refluxer and a dropping funnel. While stirring at room temperature a solution of 2.76 g. of bis-(4-hydroxyphenyl)-phenylmethane and 19.8 cc. of sodium hydroxide solution 1.0267 N is dropwise added through the funnel, within ¼ hour. The reaction mixture is further stirred for 2 hours whereby the polymer separates as a viscous mass. The supernatant water is decanted and the residue is washed for ¼ hour with 20 cc. of water while strongly stirring. The product is obtained by pouring out the viscous mass in hot water and drying at 100° C. Intrinsic viscosity measured in 1,2-dichloroethane: 0.6 dl./g. Softening point: 125° C.

The polysulfonate obtained corresponds to the formula:

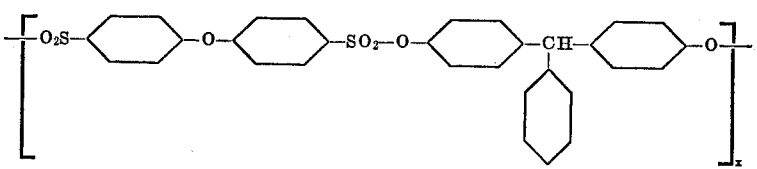

EXAMPLE 4

3.67 g. of 4,4'-diphenylether-disulfochloride, 0.05 g. of triethylbenzyl ammonium chloride and 15 cc. of methylene chloride are successively brought into a three-necked 100 cc. flask provided with a stirrer, a refluxer and a dropping funnel. While stirring at room temperature a solution of 3.52 g. of bis-(4-hydroxyphenyl)-diphenylmethane, 9.5 cc. of sodium hydroxide solution 2.14 N and 2.5 cc. of dioxane is dropwise added through the funnel within ¼ hour. After still adding 20 cc. of water, the reaction mixture is further stirred for 2 hours whereby the polymer separates as a viscous mass. The supernatant water is decanted and the residue is washed for ¼ hour with 50 cc. of water while strongly stirring. The product is obtained by pouring out the viscous mass in hot water and drying at 100° C. Intrinsic viscosity measured in 1,2-dichloroethane: 0.46 dl./g. Softening point: 130° C.

The polysulfonate obtained corresponds to the formula:

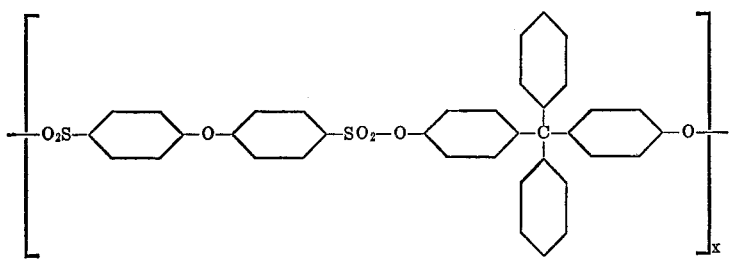

EXAMPLE 5

3.51 g. of diphenyl-p,p'-disulfochloride (0.01 mol), 0.1 g. of triethylbenzyl ammonium chloride, 3.06 g. of bis-(4-hydroxy-2,5-dimethylphenyl)-sulfone and 15 cc. of methylene chloride are successively brought into a three-necked 250 cc. flask, provided with a stirrer and a dropping funnel. While stirring at room temperature, 22.6 cc. of sodium hydroxide solution 0.891 N is dropwise added through the dropping funnel within 10 minutes. After the addition of the alkali solution, the reaction mixture is stirred at room temperature for another 60 min., whereupon a thick viscous emulsion is obtained. The polymer emulsion is diluted with 50 cc. of methylene chloride. The polymer is isolated by pouring out the polymer solution in ethanol, washing the precipitate with water and ethanol and drying the precipitate at 110° C. The intrinsic viscosity was measured in syn.-tetrachloroethane and found to be 0.4 dl./g. The polymer is only partially soluble in methylene chloride but soluble in sym.-tetrachloroethane.

The polysulfonate obtained corresponds to the formula:

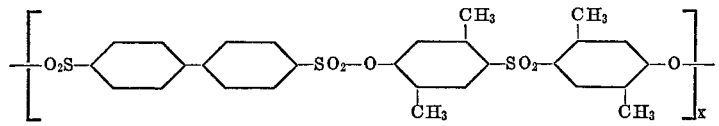

EXAMPLE 6

2.5 g. of bis-(4-hydroxyphenyl)-sulfone (0.01 mol), 18.6 cc. of sodium hydroxide solution 1.089 N, 0.1 g. of triethylbenzyl ammonium chloride are successively brought into a three-necked 250 cc. flask, provided with a stirrer and a dropping funnel. Whilst stirring and at room temperature, a solution of 3.67 g. of diphenyl-ether-p,p'-disulfochloride into 15 cc. of 1,1,2-trichloroethane is dropwise added through the dropping funel within 10 minutes. After the addition of the diacid chloride solution, the reaction mixture is stirred at room temperature for another 2 hours whereupon the polymer separates as a viscous mass. The supernatant aqueous layer is decanted and the residue washed two times with 20 cc. of water, whilst strongly stirring, whereafter the polymer solution is diluted with 50 cc. of 1,1,2-trichloroethane. The polymer is isolated by pouring out the polymer solution in ethanol, and drying the precipitate at 110° C. The intrinsic viscosity was measured in sym.-tetrachloroethane and found to be 0.62 dl./g. A film cast from a methylene chloride solution shows a softening temperature of 140–142° C. The film shows a tensile strength of 7.3 kg./sq. mm., an elongation at break of 3% and a modulus of elasticity of 300 kg./sq. mm.

The polysulfonate obtained corresponds to the formula:

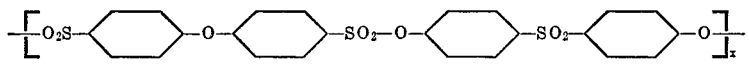

EXAMPLE 7

9.12 g. of 2,2-bis-(4-hydroxyphenyl)-propane, 84 cc. of sodium hydroxide solution 0.953 N, 0.4 g. of triethylbenzyl ammonium chloride and 10 cc. of 1,1,2-trichloroethane are successively brought into a three-necked 250 cc. flask, provided with a stirrer and a dropping funnel. While stirring at room temperature, a solution of 11 g. of benzene-1,4-disulfochloride into 35 cc. of 1,1,2-trichloroethane is dropwise added through the dropping funnel within 15 minutes. After the addition of the diacid chloride solution, the reaction mixture is stirred at room temperature for another 30 min., whereby the polymer separates as a viscous mass. The supernatant aqueous layer is decanted and the residue washed two times with 30 cc. of water, while strongly stirring, whereupon the polymer solution is diluted with 50 cc. of methylene chloride. The polymer is isolated by pouring out the polymer solution in ethanol, and drying the precipitate at 120° C. The intrinsic viscosity was measured in sym.-tetrachloroethane and found to be 1.46 dl./g. A film cast from a methylene chloride solution shows a softening temperature of 140° C.

The polysulfonate obtained corresponds to the formula:

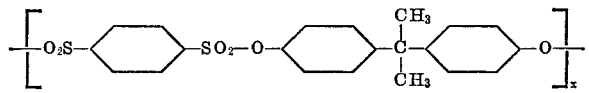

EXAMPLE 8

2.264 g. of 2,2-bis-(4-hydroxyphenyl)-propane, 19.8 cc. of sodium hydroxide solution 1.017 N, 0.1 g. of triethylbenzyl ammonium chloride and 5 cc. of methylene chloride are successively brought into a three-necked 250 cc. flask, provided with a stirrer and a dropping funnel. While stirring at room temperature, a solution of 4.12 g. of diphenyl sulfone-m,m'-disulfochloride in 25 cc. of methylene chloride is dropwise added through the dropping funnel within 10 minutes. After the addition of the diacid chloride solution, the reaction mixture is stirred at room temperature for another 2 hours, whereby the polymer separates as a viscous mass. The supernatant aqueous layer is decanted and the residue washed two times with 20 cc. of water, whilst strongly stirring, whereupon the polymer solution is diluted with 50 cc. of methylene chloride. The polymer is isolated by pouring out the polymer solution in ethanol, and drying the precipitate at 70° C. The intrinsic viscosity was measured in sym.-tetrachloroethane and found to be 0.85 dl./g. A film cast from a methylene chloride solution shows a softening temperature of 100° C.

The polysulfonate obtained corresponds to the formula:

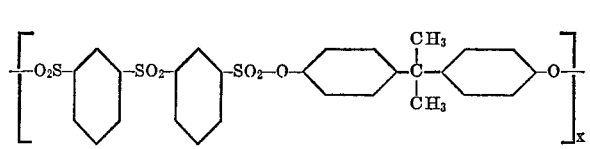

EXAMPLE 9

3.65 g. of diphenylmethane-p,p'-disulfochloride (0.01 mol), 0.1 g. of triethylbenzyl ammonium chloride and 15 cc. of methylene chloride are successively brought into a three-necked 250 cc. flask, provided with a stirrer and a dropping funnel. While stirring at room temperature, a solution of 2 g. of bis-(4-hydroxyphenyl)-methane in 18.6 cc. of sodium hydroxide solution 1.089 N is dropwise added through the dropping funnel within 10 minutes. After the addition of the bisphenol solution, the reaction mixture is stirred at room temperature for another 2½ hours, whereby the polymer separates as a viscous mass. The supernatant aqueous layer is decanted and the residue washed two times with 50 cc. of water, while strongly stirring, whereafter the polymer solution is diluted with 50 cc. of methylene chloride. The polymer is isolated by pouring out the polymer solution in methanol, and drying the precipitate at 110° C. The intrinsic viscosity was measured in sym.-tetrachloroethane and found to be 1.5 dl./g. A film cast from a methylene chloride solution shows a softening temperature of 110° C.

The polysulfonate obtained corresponds to the formula:

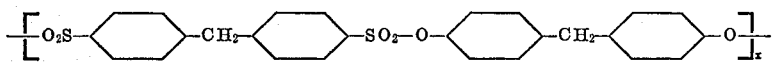

EXAMPLE 10

3.51 g. of 4,4'-diphenyl-disulfochloride, 0.05 g. of triethylbenzyl ammonium chloride and 20 cc. of methylene chloride are successively brought into a three-necked 100 cc. flask provided with a stirrer, a refluxer and a dropping funnel. While stirring at room temperature a solution of 2.9 g. of bis-(4-hydroxyphenyl)-phenyl methyl methane, 9.5 cc. of sodium hydroxide solution 2.14 N and 10 cc. of dioxane is dropwise added through the funnel within ¼ hour. The reaction mixture is further stirred for 2 hours while the polymer separates as a viscous mass. The supernatant water is decanted and the residue is washed for ¼ hour with 50 cc. of water while strongly stirring. The product is obtained by pouring out the viscous mass in hot water and drying at 100° C. Intrinsic viscosity measured in 1,2-dichloroethane: 0.5 dl./g. Softening point: 160° C.

The polysulfonate obtained corresponds to the formula:

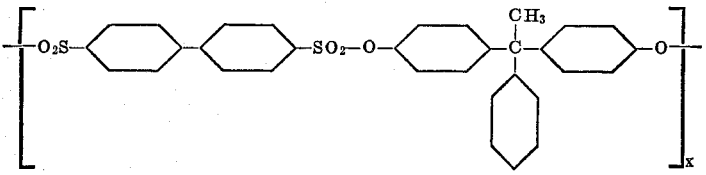

EXAMPLE 11

3.51 g. of 4,4'-diphenyl-disulfochloride, 0.05 g. of triethylbenzyl ammonium chloride and 20 cc. of dichloromethane, are successively brought into a three-necked 100 cc. flask provided with a stirrer, a refluxer and a dropping funnel. While stirring at room temperature a solution of 2.68 g. of 1,1-bis-(4-hydroxyphenyl)-cyclohexane, 9.5 cc. of sodium hydroxide 2.14 N, 4 cc. of dioxane and 5 cc. of water is dropwise added to the funnel within ¼ hours. After adding 20 cc. of water, the reaction mixture is further stirred for 2 hours whereby the polymer separates as a viscous mass. The supernatant water is decanted and the residue is washed for ¼ hour with 50 cc. of water while strongly stirring. The product is obtained by pouring out the viscous mass in hot water and drying at 100° C. Intrinsic viscosity measured in 1,2-dichloroethane: 0.5 dl./g. Softening point: 155° C.

The polysulfonate obtained corresponds to the formula:

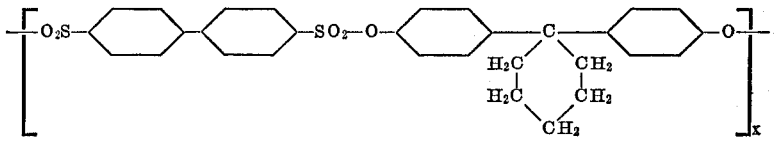

EXAMPLE 12

3.51 g. of 4,4'-diphenyl-disulfochloride, 0.05 g. of triethylbenzyl ammonium chloride and 20 cc. of methylene chloride are successively brought into a three-necked 100 cc. flask provided with a stirrer, a refluxer and a dropping funnel. While stirring at room temperature a solution of 2.42 g. of 2,2-bis-(4-hydroxyphenyl)-butane and 19.8 cc. of sodium hydroxide solution 1.0267 N is dropwise added through the funnel within ¼ hour. The reaction mixture is further stirred for 2 hours whereby the polymer separates as a viscous mass. The supernatant water is decanted and the residue is washed for ¼ hour with 20 cc. of water while strongly stirring. The product is obtained by pouring out the viscous mass in hot water and drying at 200° C. Intrinsic viscosity measured in 1,2-dichloroethane: 0.7 dl./g. Softening point: 135° C.

The polysulfonate obtained corresponds to the formula:

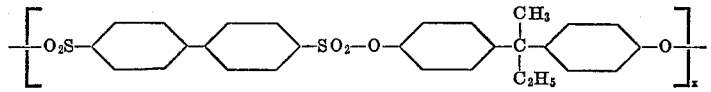

EXAMPLE 13

7.02 g. of 4,4'-diphenyl-disulfochloride, 0.2 g. of triethylbenzyl ammonium chloride and 50 cc. of methylene chloride are successively brought into a three-necked 250 cc. flask provided with a stirrer and a dropping funnel. While stirring at room temperature a solution of 7.32 g. of 2,2-bis-(4-hydroxy-3,5-dichlorophenyl)-propane and 39.8 cc. of sodium hydroxide solution 1.017 N is dropwise added through the funnel within 10 min. The reaction mixture is further stirred for 1½ hours whereby the polymer separates as a viscous mass. The supernatant water is decanted and the residue is washed with water until neutral while strongly stirred. The product is obtained by pouring out the viscous mass in hot water and drying at 100° C. (solid flakes). Intrinsic viscosity measured in 1,2-tetrachloroethane 1.67 dl./g. Softening point: 180–190° C.

The polysulfonate obtained corresponds to the formula:

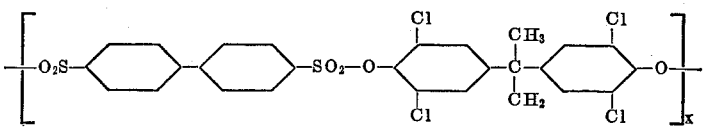

EXAMPLE 14

3.67 g. of 4,4'-diphenylether-disulfochloride, 0.1 g. of triethylbenzyl ammonium chloride and 20 cc. of methylene chloride are successively brought into a three-necked 250 cc. flask provided with a stirrer and a dropping funnel. While stirring at room temperature a solution of 3.66 g. of 2,2 - bis-(4-hydroxy-3,5-dichlorophenyl)-propane and 19.9 cc. of sodium hydroxide solution 1.017 N is dropwise added through the funnel within 10 min. The reaction mixture is further stirred for 1 hour whereby the polymer separates as a viscous mass. The supernatant water is decanted and the residue is washed with water until neutral while strongly stirring. The flocky product is obtained after dilution with methylene chloride and precipitation in ethanol. Intrinsic viscosity measured in 1,2-tetrachloroethane: 2.5 dl./g. Softening point: 140° C.

The polysulfonate obtained corresponds to the formula:

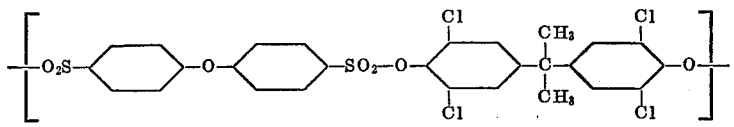

EXAMPLE 15

2.89 g. of 2,1-toluene disulfochloride, 0.1 g. of triethylbenzyl ammonium chloride and 15 cc. of methylene chloride are successively brought into a three-necked 250 cc. flask provided with a stirrer and a dropping funnel. While stirring at room temperature a solution of 5.44 of 2,2-bis-(4-hydroxy-3,5-dibromophenyl)-propane and 19.9 cc. of sodium hydroxide solution 1.017 N is dropwise added through the funnel within 10 min. The reaction mixture is further stirred for 1½ hours whereby the polymer separates as a viscous mass. The supernatant water is decanted and the residue is washed with water until neutral whilst strongly stirring. The flocky product is obtained after dilution with methylene chloride and precipitation in ethanol. Intrinsic viscosity measured in 1,2-tetrachloroethane: 0.88 dl./g. Softening point: 170–174° C. A film cast from methylene chloride has an elasticity modulus of 310 kg./sq. mm.

The polysulfonate obtained corresponds to the formula:

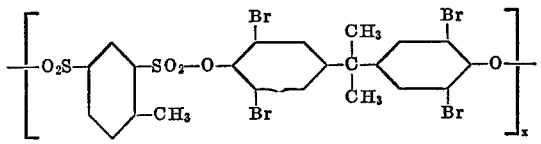

EXAMPLE 16

6.06 g. of 1,3-dimethylbenzene-4,6-disulfochloride (0.02 mol) 200 mg. of triethylbenzyl ammonium chloride and 20 cc. of methylene chloride are successively brought into a three-necked 250 cc. flask, provided with a stirrer and a dropping funnel. While stirring at room temperature, a solution of 4.56 g. of 2,2-bis-(4-hydroxyphenyl)-propane (0.02 mol) in 40.4 cc. of sodium hydroxide solution 1 N is dropwise added through the dropping funnel within 15 minutes. After the addition of the diacid chloride solution, the reaction mixture is stirred at room temperature for another 30 min. whereby the polymer separates as a viscous mass. The supernatant aqueous layer is decanted and the residue washed two times with 50 cc. of water, while strongly stirring, whereupon the polymer solution is diluted with 20 cc. of methylene chloride. The polymer is isolated by pouring out the polymer solution in boiling water, and drying the precipitate at 110° C. The intrinsic viscosity was measured in sym.-tetrachloroethane and found to be 1.54 dl./g. A film cast from a methylene chloride solution shows a softening temperature of 100° C. and a modulus of elasticity of 330 kg./sq. mm.

The polysulfonate obtained corresponds to the formula:

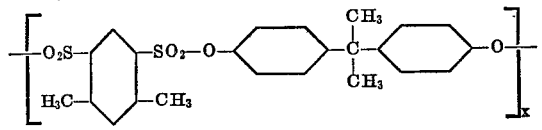

EXAMPLE 17

4.56 g. of 2,2-bis-(4-hydroxyphenyl)-propane (0.02 mol), 40.4 cc. of sodium hydroxide 1 N, 150 mg. of triethylbenzyl ammonium chloride and 20 cc. of water are successively brought into a three-necked 250 cc. flask, provided with a stirrer and a dropping funnel. Whilst stirring at room temperature, a solution of 6.19 g. of 1-chlorobenzene-2,4-disulfochloride (0.02 mol) into 20 cc. of benzene is dropwise added through the dropping funnel within 15 minutes. After the addition of the diacid chloride solution, the reaction mixture is stirred at room temperature for another 2 hours whereby the polymer separates as a viscous mass. The supernatant aqueous layer is decanted and the residue washed two times with 50 cc. of water, whilst strongly stirring, whereafter the polymer solution is diluted with 50 cc. of methylene chloride. The polymer is isolated by pouring out the polymer solution in boiling water, and drying the precipitate at 100° C. The intrinsic viscosity was measured in sym-tetrachloroethane and found to be 0.92 dl./g. A film cast from a methylene chloride solution shows a softening temperature of 75° C. and a modulus of elasticity of 311 kg./sq. mm..

The polysulfonate obtained corresponds to the formula:

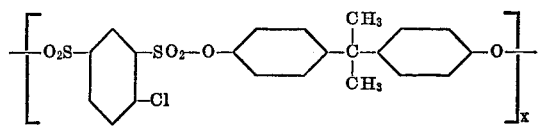

EXAMPLE 18

2.75 g. of 1,3-benzene-disulfochloride, 0.1 g. of triethylbenzyl ammonium chloride and 20 cc. of methylene chloride are successively brought into a three-necked 250 cc. flask provided with a stirrer and a dropping funnel. While stirring at room temperature a solution of 3.66 g. of 2,2-bis-(4-hydroxy-3,5-dichlorophenyl)-propane and 20.5 cc. of sodium hydroxide solution 1 N is dropwise added through the funnel within 5 min. The reaction mixture is further stirred for 1 hour whereby the polymer separates as a viscous mass. The supernatant water is decanted and the residue is washed with water. The product is obtained by pouring out the viscous mass in hot water and drying at 100° C. (hard flakes). Intrinsic viscosity measured in 1,2-tetrachloroethane: 0.96 dl./g. Softening point: 140–147° C. A film cast from methylene chloride has an elasticity modulus of 345 kg./sq. mm.

The polysulfonate obtained corresponds to the formula:

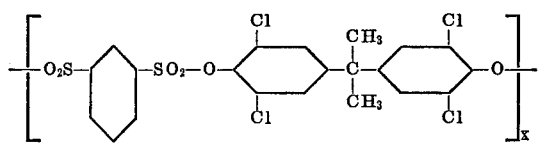

EXAMPLE 19

7.02 g. of 4,4'-diphenyl-disulfochloride (0.02 mol), 0.2 g. of triethylbenzyl ammonium chloride and 40 cc. of methylene chloride are successively brought into a three-necked 250 cc. flask, provided with a stirrer and a dropping funnel. While stirring at room temperature, a solution of 5.12 g. of 2,2-bis-(4-hydroxy-3-methyl)-propane (0.02 mol) and 40.3 cc. of sodium hydroxide solution 1.0077 N is dropwise added through the dropping funnel within 10 minutes. After the addition of the bisphenol solution, the reaction mixture is stirred at room temperature for another 2½ hours whereby the polymer separates as a viscous mass. The supernatant layer is decanted and the residue washed two times with 50 cc. of water, whilst strongly stirring, whereupon the polymer solution is diluted with 50 cc. of methylene chloride. The polymer is isolated by pouring out the polymer solution in methanol, and drying the precipitate at 120° C. The intrinsic viscosity was measured in sym.-tetrachloroethane and found to be 1.4 dl./g. A film cast from a methylene chloride solution shows a softening temperature of 132–136° C.

The polysulfonate obtained corresponds to the formula:

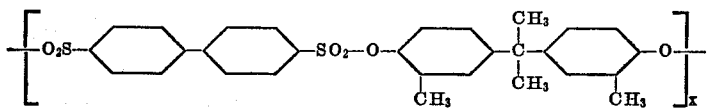

EXAMPLE 20

3.51 g. of 4,4' - diphenyl - disulfochloride (0.01 mol), 0.1 g. of triethylbenzyl ammonium chloride and 20 cc. of methylene chloride are successively brought into a three-necked 250 cc. flask, provided with a stirrer and a dropping funnel. While stirring at room temperature, a solution of 2.28 g. bis - (4 - hydroxy - 3 - methylphenyl)-methane (0.01 mol) in 18.6 cc. of sodium hydroxide solution 1.089 N is dropwise added through the dropping funnel within 10 minutes. After the addition of the bisphenol solution the reaction mixture is stirred at room temperature for another 60 min., whereby the polymer separates as a viscous mass. The supernatant aqueous layer is decanted and the residue washed two times with 50 cc. of water, while strongly stirring, whereupon the polymer solution is diluted with 50 cc. of methylene chloride. The polymer is isolated by pouring out the polymer solution in methanol, and drying the precipitate at 110° C. The intrinsic viscosity was measured in sym.-tetrachloroethane and found to be 0.7 dl./g. A film cast from a methylene chloride solution shows a softening temperature of 110–115° C.

The polysulfonate obtained corresponds to the formula:

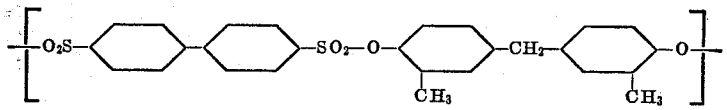

EXAMPLE 21

A 250 cc. flask, fitted with a stirrer, a thermometer and a dropping funnel, is filled with a mixture of 3.51 g. of 4,4 - diphenyl - disulfochloride, 0.1 g. of triethylbenzyl ammonium chloride and 15 cc. of methylene chloride. Whilst stirring, an aqueous solution of 2.56 g. of bis-(4 - hydroxy - 3,5 - dimethylphenyl) - methane in 19.8 cc. of sodium hydroxide 1.043 N is added within 15 minutes. After the addition of the bisphenate solution, the reaction mixture is stirred for another 60 minutes whereupon the aqueous layer is decanted; the reaction mixture is subsequently washed two times with 100 cc. of water, the water layer is decanted, the organic layer diluted with 25 cc. of methylene chloride and 100 cc. of methanol is added to the polymer solution, and the precipitate is isolated and dried. Yield: 5.2 g. The polymer obtained can be represented by the following structural formula:

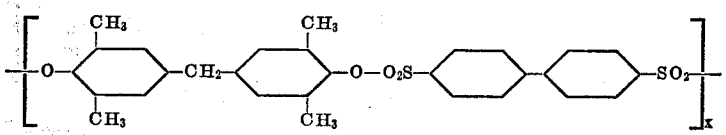

The intrinsic viscosity was measured in sym.-tetrachloroethane and found to be 1.14 dl./g. A 15% solution was made in methylene chloride and spread out with a doctor blade on a glass plate. The resulting transparent polymer film was dried at 100° C. for 10 hours. The mechanical properties of the film, measured on an Instron tester were as follows:

Tensile strength, kg./sq. mm. _____ 5.7
Modulus of elasticity, kg./sq. mm. _____ 225
Elongation at break, percent _____ 55
Softening range, ° C. _____ 140–170

The elongation at break of the film obtained from this polysulfonate is the more unexpected since by using in the production of the polysulfonates a bisphenate of a bisphenol of slightly different chemical composition such as of a bisphenol represented by the formula:

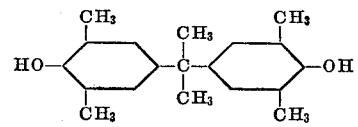

only an elongation at break of 3% of the unstretched polysulfonate films is measured. Also the use of bisphenols having only one methyl group on each phenyl nucleus and without substituents on the central carbon atom results in a low elongation at break of the polysulfonate films.

EXAMPLE 22

3.51 g. of 4,4'-diphenyl-disulfochloride (0.01 mol), 0.1 g. of triethylbenzyl ammonium chloride, 3.06 g. bis-(4-hydroxy-3,5-dimethylphenyl)-sulfone (0.01 mol) and 15 cc. of methylene chloride are successively brought into a three-necked 250 cc. flask, provided with a stirrer and a dropping funnel. While stirring at room temperature, 22.6 cc. of sodium hydroxide solution 0.891 N is dropwise added through the dropping funnel within 10 minutes. After the addition of the sodium hydroxide solution, the reaction mixture is stirred at room temperature for another 2 hours whereby the polymer separates as a viscous mass. The supernatant aqueous layer is decanted and the residue washed two times with 50 cc. of water, while strongly stirring, whereupon the polymer solution is diluted with 50 cc. of methylene chloride. The polymer is isolated by pouring out the polymer solution in ethanol, and drying the precipitate at 110° C. The intrinsic viscosity was measured in sym.-tetra-chloroethane and found to be 1.16 dl./g. A film cast from a methylene chloride solution shows a softening temperature of 195° C., does not show the deficiency known as crazing and is cold-drawable.

The polysulfonate obtained corresponds to the formula:

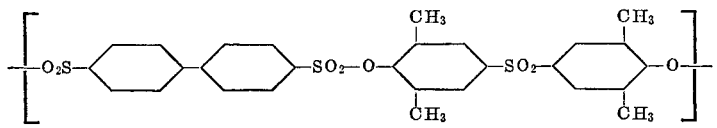

EXAMPLE 23

3.51 g. of 4,4'-diphenyl-disulfochloride (0.01 mol), 0.1 g. of triethylbenzyl ammonium chloride, 2.56 g. of bis-(4-hydroxy-2,5-dimethylphenyl)-methane and 15 cc. of methylene chloride are successively brought into a three-necked 250 cc. flask, provided with a stirrer and a dropping funnel. While stirring at room temperature, 22.6 cc. of sodium hydroxide solution 0.891 N is dropwise added through the dropping funnel within 10 minutes. After the addition of the alkali solution, the reaction mixture is stirred at room temperature for another 90 min., whereby the polymer separates as a viscous mass. The supernatant aqueous layer is decanted and the residue washed two times with 100 cc. of water, while strongly stirring, whereupon the extremely viscous polymer solution is diluted with 100 cc. of methylene chloride. The polymer is isolated by pouring out the polymer solution in hot water, and drying the precipitate at 110° C. The intrinsic viscosity was measured in sym.-tetrachloroethane and found to be 2.45 dl./g. The polymer is only partially soluble in methylene chloride.

The polysulfonate obtained corresponds to the formula:

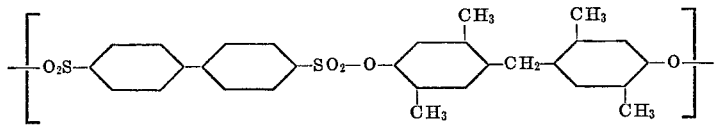

EXAMPLE 24

3.51 g. of 4,4'-diphenyl-disulfochloride (0.01 mol), 2.95 g. of 4,4'-diphenylether-dicarboxylic acid chloride (0.01 mol), 0.1 g. of triethylbenzyl ammonium chloride and 40 cc. of methylene chloride are successively brought into a three-necked 250 cc. flask provided with a stirrer and a dropping funnel. While stirring at room temperature a solution of 4.56 g. of 2,2-bis-(4-hydroxyphenyl)-propane (0.02 mol) and 37.2 cc. of sodium hydroxide solution 1.089 N is dropwise added, within 10 minutes, and stirring is continued for another 3 hours. Two layers are obtained the underlayer of which is a very viscous mass which is separated and washed and then diluted with methylene chloride and precipitated in ethanol. The light flakes are dried at 110° C. The polymer has an intrinsic viscosity in sym.-tetrachloroethane of 1.62 dl./g. A film cast from methylene chloride solution shows a good elongation and possesses a softening point of 160–180° C.

EXAMPLE 25

3.51 g. of 4,4'-diphenyl-disulfochloride (0.01 mol), 2.03 g. of terephthaloylchloride (0.01 mol), 0.1 g. of triethylbenzyl ammonium chloride and 40 cc. of methylene chloride are successively brought into a three-necked 250 cc. flask provided with a stirrer and a dropping funnel. While stirring at room temperature, a solution of 4.56 g. of 2,2-bis-(4-hydroxyphenyl)-propane (0.02 mol) and 37.2 cc. of sodium hydroxide solution 1.089 N is dropwise added within 10 minutes, and stirring is continued for another 3 hours. Two layers are obtained the bottom layer of which is a viscous mass which is separated and washed with water and then diluted with methylene chloride and precipitated in ethanol. The white flakes are dried at 110° C. The polymer has an intrinsic viscosity in sym.-tetrachloroethane of 1.65 dl./g. whereas a film cast from methylene chloride solution shows a good elongation at break and a softening point of 160–180° C. The mechanical properties measured on an Instron tester are the following: tensile strength: 7.5 kg./sq. mm., elasticity modulus: 240 kg./sq. mm., elongation at break: 25%.

EXAMPLE 26

3.51 g. of 4,4'-diphenyl-disulfochloride (0.01 mol), 2.03 g. of terephthaloyl chloride (0.01 mol), 0.2 g. of triethylbenzyl ammonium chloride and 30 cc. of methylene chloride are successively brought into a three-necked 250 cc. flask provided with a stirrer and a dropping funnel. While stirring at room temperature a solution of 5.12 g. of 2,2-bis-(4-hydroxy - 3 - methylphenyl)-propane (0.02 mol) and 39.8 cc. of sodium hydroxide solution 1.017 N is dropwise added within 10 minutes, and stirring is continued for another 2 hours. After adding water and stirring the mixture is isolated in 2 layers the bottom layer of which is further washed and then precipitated in ethanol. The flakes are dried at 110° C. The polymer has an intrinsic viscosity of 0.68 dl./g. in sym.-tetrachloroethane whereas a film cast from methylene chloride solution shows good elongation at break and possesses a softening point of 142–153° C.

EXAMPLE 27

3.51 g. of 4,4'-diphenyl-disulfochloride (0.01 mol), 0.1 g. of triethylbenzyl ammonium chloride and 20 cc. of 1,1,2-trichloroethane are successively brought into a three-necked 250 cc. flask provided with a stirrer and a dropping funnel. While stirring at room temperature a solution of 2.28 g. of 2,2-bis-(4-hydroxyphenyl)-propane (0.01 mol) in 18.6 cc. of sodium hydroxide solution 1.084 N is dropwise added within 20 minutes. At the same time 2.28 g. of 2,2-bis(4-hydroxyphenyl)-propane (0.01 mol), 18.55 cc. of sodium hydroxide solution 1.084 N, 10 cc. of 1,1,2-trichloroethane and 0.1 g. of triethylbenzyl ammonium chloride are successively brought into a second three-necked flask. While stirring at room temperature a solution of 2.03 g. of terephthaloyl chloride (0.01 mol) in 30 cc. of 1,1,2-trichloroethane is dropwise added within 20 minutes. Thereafter the contents of the second flask is poured into the first flask and the mixture thus obtained is stirred for 3 hours. After adding water two layers are obtained the bottom layers of which is washed with water and precipitated in ethanol. The flakes obtained are dried at 100° C. The intrinsic viscosity of the polymer amounts to 1.35 dl./g. in sym.-tetrachloroethane, whereas a film cast from sym.-tetrachloroethane possesses a softening point of 157–162° C.

EXAMPLE 28

7.02 g. of 4,4'-diphenyl-disulfochloride (0.02 mol), 4.06 g. of isophthaloyl chloride (0.02 mol), 0.4 g. of triethylbenzyl ammonium chloride and 80 cc. of 1,1,2-trichloroethane are successively brought into a three-necked 250 cc. flask provided with a stirrer and a dropping funnel. While stirring at 20° C. a solution of 9.12 g. of 2,2-bis-(4-hydroxyphenyl)-propane (0.04 mol) in 74.4 cc. of sodium hydroxide solution 1.089 N is dropwise added within 20 minutes, and stirring is continued for another 5 hours whereupon two layers are obtained the bottom layer of which forms a viscous mass which is washed with water and then precipitated in ethanol. The tough flakes are dried at 100° C. The polymer obtained has an intrinsic viscosity of 1.14 dl./g. in sym.-tetrachloroethane whereas a film cast from methylene chloride solution shows a softening point of 142–160° C. The film obtained is flexible and shows on rough manipulation no tendency to craze.

EXAMPLE 29

4.584 g. of 2,2-bis(4-hydroxyphenyl)propane, 39 cc. of sodium hydroxide solution 1.043 N, 7 cc. of methylene chloride and 0.2 g. of triethylbenzyl ammonium chloride are brought successively into a three-necked 250 cc. flask provided with a stirrer and a dropping funnel. While stirring and cooling in ice-water, a solution of 4.806 g. of benzoylchloride-m-sulfochloride in 10 cc. of methylene chloride is dropwise added within 10 minutes, and stirring is continued for another 2 hours whereafter two layers are obtained the bottom of which is a viscous mass which is isolated and washed with water and after dilution with methylene chloride is precipitated in methanol. The flakes are dried at 100° C. The polymer has an intrinsic viscosity of 0.80 dl./g. in sym.-tetrachloroethane, whereas a film cast from methylene chloride solution has a softening point of 122° C. The mechanical properties of the film obtained, measured on an Instron tester are the following: tensile strength: 7.5 kg./sq. mm., elasticity modulus: 280 kg./sq. mm., elongation at break: 10%.

EXAMPLE 30

4.56 g. of 2,2-bis-(4-hydroxyphenyl)-propane (0.02 mol), 38.8 cc. of sodium hydroxide solution 1.043 N, 7 cc. of methylene chloride and 0.2 g. of triethylbenzyl ammonium chloride are successively brought into a three-necked 250 cc. flask provided with a stirrer and a dropping funnel. While stirring at room temperature a solution of 4.78 g. of benzoylchloride-p-sulfochloride in 10 cc. of methylene chloride is dropwise added within 10 minutes, whereupon stirring is continued for 2 hours. Two layers are obtained the bottom layer of which is a viscous mass which is washed with water and precipitated in methanol. The flakes are dried at 100° C. The polymer has an intrinsic viscosity of 0.80 dl./g. in sym.-tetrachloroethane, whereas a film cast from methylene chloride solution shows a softening point of 155° C., and an elongation at break of 10%.

EXAMPLE 31

4.56 g. of 2,2-bis-(4-hydroxyphenyl)-propane (0.02 mol), 45.3 cc. of sodium hydroxide solution 0.891 N, 0.2 g. of triethylbenzyl ammonium chloride and 10 cc. of methylene chloride are successively brought into a three-necked 250 cc. flask, provided with a stirrer and a dropping funnel. While stirring at room temperature a solution of 2.03 g. of terephthaloyl chloride (0.01 mol) and 1.55 g. of benzoylchloride-m-sulfochloride in 10 cc. of methylene chloride is dropwise added through the dropping funnel within 15 minutes. After the addition of the diacid chloride solution, the reaction mixture is stirred at room temperature for another 75 min., whereby the polymer separates as a viscous mass. The supernatant aqueous layer is decanted and the residue washed two times with 50 cc. of water, while strongly stirring, whereupon the polymer solution is diluted with 50 cc. of methylene chloride. The polymer is isolated by pouring out the polymer solution in methanol, and drying the precipitate at 110° C. The intrinsic viscosity was measured in sym.-tetrachloroethane and found to be 0.7 dl./g. A film cast from a methylene chloride solution shows a softening temperature of 150° C. and is cold-drawable. The elongation at break is 45%.

EXAMPLE 32

9.12 g. of 2,2-bis-(4-hydroxyphenyl)-propane (0.04 mol), 77.6 cc. of sodium hydroxide solution 1.043 N, 0.4 g. of triethylbenzyl ammonium chloride and 10 cc. of methylene chloride are successively brought into a three-necked 250 cc. flask provided with a stirrer and a dropping funnel. While stirring at room temperature a solution of 5.5 g. of 1,3-benzene-disulfochloride (0.02 mol) and 4.06 g. of isophthaloylchloride (0.02 mol) in 20 cc. of methylene chloride is dropwise added within 5 minutes, and stirring is continued for another 1 hour. Two layers are obtained the bottom layer of which is washed with water and precipitated in methanol. The flakes obtained are dried at 110° C. The polymer has an intrinsic viscosity of 0.50 dl./g. in sym.-tetrachloroethane and a film cast from methylene chloride solution shows a softening point of 105–110° C.

EXAMPLE 33

9.12 g. of 2,2-bis(4-hydroxyphenyl)-propane (0.04 mol), 81.5 cc. of sodium hydroxide solution 0.9905 N, 0.4 g. triethylbenzyl ammonium chloride and 20 cc. of methylene chloride are successively brought into a three-necked 250 cc. flask, provided with a stirrer and a dropping funnel. While stirring at room temperature, a solution of 4.06 g. of isophthaloyl chloride (0.02 mol) and 3.1 cc. of benzoylchloride-m-sulfochloride (0.02 mol) into 20 cc. of methylene chloride is dropwise added through the dropping funnel within 20 minutes. After the addition of the diacid chloride solution, the reaction mixture is stirred at room temperature for another 2 hours whereby the polymer separates as a viscous mass. The supernatant aqueous layer is decanted and the residue washed two times with 50 cc. of water, while strongly stirring, whereupon the polymer solution is diluted with 50 cc. of methylene chloride. The polymer is isolated by pouring out the polymer solution in hot water, and drying the precipitate at 110° C. The intrinsic viscosity was measured in sym.-tetrachloroethane and found to be 0.74 dl./g. A film cast from a methylene chloride solution shows a softening temperature of 140° C., a tensile strength of 8 kg./sq. mm., a yield strength of 7.1 kg./sq. mm., an elasticity modulus of 225 kg./sq. mm. and an elongation at break of 15%.

EXAMPLE 34

5.616 g. of 4,4'-diphenyl-disulfochloride (0.016 mol), 0.2 g. of triethylbenzyl ammonium chloride, 15 cc. of methylene chloride, 4.104 g. of 2,2-bis-(4-hydroxyphenyl)-propane (0.018 mol) and 39.3 cc. of sodium hydroxide solution 0.963 N are successively brought into a three-necked 250 cc. flask provided with a stirrer and a dropping funnel. While stirring at room temperature a solution of 0.740 g. of 2,2-bis(4-hydroxyphenyl)-propane-bis-chloroformate (0.0021 mol) in 15 cc. of methylene chloride is dropwise added within 10 minutes and stirring is continued for another 1½ hours whereafter two layers are obtained the bottom layer of which, a viscous mass, is washed with water, diluted with methylene chloride and precipitated in boiling water. The rough flakes are dried at 110° C. The polymer has an intrinsic viscosity of 2.18 dl./g. in sym.-tetrachloroethane whereas a film cast from methylene chloride solution shows a softening point of 147–150° C. The film is flexible and possesses a good elongation at break: 10%.

EXAMPLE 35

3.51 g. of 4,4'-diphenyl-disulfochloride (0.01 mol), 0.2 g. of triethylbenzyl ammonium chloride, 15 cc. of methylene chloride, 3.42 g. of 2,2-bis-(4-hydroxyphenyl)-propane (0.015 mol) and 32.8 cc. of sodium hydroxide solution 0.963 N are successively brought into a three-necked 250 cc. flask provided with a stirrer and a dropping funnel. While stirring at room temperature a solution of 1.8 g. of 2,2 - bis(4 - hydroxyphenyl) - propane-bis-chloroformate (0.0051 mol) in 10 cc. of methylene chloride is added to this mixture within 7 minutes, whereupon stirring is continued for another 1 hour. Two layers are obtained the bottom layer of which is very viscous. This layer is washed with water, diluted with methylene chloride and poured out in boiling water. Rough flakes are obtained which are dried at 110° C. The polymer has an intrinsic viscosity of 2.2 dl./g. in sym.-tetrachloroethane, whereas the film cast from methylene chloride solution shows a softening point of 148° C. The film is flexible and shows on rough manipulation no tendency to craze.

EXAMPLE 36

1.755 g. of 4,4'-diphenyl-disulfochloride (0.005 mol), 0.2 g. of triethylbenzyl ammonium chloride, 10 cc. of methylene chloride, 3.42 g. of 2,2-bis-(4-hydroxyphenyl)-propane (0.015 mol) and 32.8 cc. of sodium hydroxide solution 0.963 N are successively brought into a three-necked 250 cc. flask provided with a stirrer and a dropping funnel. While stirring at room temperature a solution of 3.88 g. of 2,2-bis-(4-hydroxyphenyl)-propane-bis-chloroformate (0.11 mol) in 15 cc. of methylene chloride is dropwise added within 10 minutes and stirring is continued for another 1 hour whereup two layers are obtained, the bottom layer of which is a viscous mass which is washed with water, diluted with methylene chloride and precipitated in boiling water. The polymer is dried at 100° C. and has an intrinsic viscosity of 1.32 dl./g. in sym.-tetrachloroethane, whereas a film cast from methylene chloride solution has a softening point of 140° C.

EXAMPLE 37

4.11 g. of 4,4'-diphenyl-disulfochloride, 0.3 g. of triethylbenzyl ammonium chloride, 15 cc. of methylene chloride, 5.34 g. of 2,2-bis-(4-hydroxyphenyl)-propane and 49.2 cc. of sodium hydroxide solution 0.963 N are successively brought into a three-necked 250 cc. flask provided with a stirrer and a dropping funnel. While stirring and cooling in ice-water, a solution of 2.813 g. of sebacoyl chloride in 15 cc. of methylene chloride is dropwise added within 15 minutes and stirring is continued for another 1 hour. The bottom layer is washed with water and precipitated in hot water. The polymer is dried at 110° C. and has an intrinsic viscosity of 0.51 dl./g. in sym.-tetrachloroethane, and a film cast from methylene chloride solution has a softening point of 130° C.

EXAMPLE 38

3.51 g. of 4,4'-diphenyl-disulfochloride (0.01 mol), 3.53 g. of 2,2-bis-(4-hydroxyphenyl)-propane-bis-chloroformate (0.01 mol), 0.2 g. of triethylbenzyl ammonium chloride and 30 cc. of methylene chloride are successively brought into a three-necked 250 cc. flask provided with a stirrer and a dropping funnel. While stirring, a solution of 4.56 g. of 2,2-bis-(4-hydroxyphenyl)-propane (0.02 mol) in 42 cc. of sodium hydroxide solution 0.963 N is dropwise added within 10 minutes to this mixture, and stirring is continued for another 1 hour, whereupon the bottom layer is separated, washed with water and precipitated in boiling water. The polymer is dried at 110° C. and has an intrinsic viscosity of 1.18 dl./g. in sym.-tetrachloroethane, and a film cast from a methylene chloride solution shows a softening point of 147° C.

EXAMPLE 39

70.2 g. of 4,4'-diphenyl-disulfochloride (0.2 mol), 35.3 g. of 2,2 - bis - (4-hydroxyphenyl)-propane-bis-chloroformate (0.1 mol), 3 g. of triethylbenzyl ammonium chloride and 500 cc. of methylene chloride are successively brought into a three-necked 3 liter flask provided with a stirrer, a dropping funnel and a thermometer. While stirring at a temperature of 25° C. a solution of 68.4 g. of 2,2-bis-(4-hydroxyphenyl)-propane (0.3 mol), 25 g. of sodium hydroxide and 600 cc. of water is dropwise added within 20 minutes, and stirring is continued for another 1 hour. Two layers are obtained the bottom layer of which is a viscous mass which is washed with water and then after dilution with 500 cc. of methylene chloride poured out into boiling water. The tough flakes are dried at 110° C. The polymer obtained has an intrinsic viscosity of 1.60 dl./g. in sym.-tetrachloroethane, and a film cast from methylene chloride solution shows a softening point of 150° C.

EXAMPLE 40

28.80 g. of 4,4'-diphenyl-disulfochloride (0.08 mol), 3.73 g. of 2,2-bis-(4-hydroxyphenyl)-propane-bis-chloroformate (0.01056 mol), 1 g. of triethylbenzyl ammonium chloride and 150 cc. of methylene chloride are successively placed in a three-necked 1 liter flask provided with a stirrer and a dropping funnel. While stirring at room temperature a solution of 20.52 g. of 2,2-bis-(4-hydroxyphenyl)-propane (0.09 mol) and 7.3 g. of sodium hydroxide in 150 cc. of water is dropwise added within 7 minutes, and stirring is continued for 1¼ hour. Two layers are obtained, the bottom layer of which is a viscous mass which is washed with water, diluted with 100 cc. of methylene chloride and then precipitated in boiling water. The white flakes are dried at 100° C. The polymer has an intrinsic viscosity of 1 dl./g. in sym.-tetrachloroethane, and a film cast from a methylene chloride solution shows a softening point of 154° C.

EXAMPLE 41

7.02 g. of 4,4'-diphenyl-disulfochloride (0.02 mol), 0.2 g. of triethylbenzyl ammonium chloride and 30 cc. of methylene chloride are successively placed in a three-necked 250 cc. flask provided with a stirrer and a dropping funnel. While stirring at room temperature a solution of 4.56 g. of 2,2-bis-(4-hydroxyphenyl)-propane (0.02 mol) in 42 cc. of sodium hydroxide solution 0.963 N is dropwise added within 10 minutes and stirring is continued for another 5 to 10 minutes. As soon as a thick milky mass is obtained, a solution of 3.60 g. of 2,2-bis-(4-hydroxyphenyl)-propane -bis-chloroformate (0.0102 mol), 0.1 g. of triethylbenzyl ammonium chloride and 20 cc. of methylene chloride is added thereto. Whilst stirring a solution of 2.28 g. of 2,2-bis-(4-hydroxyphenyl)-propane (0.01 mol) in 22 cc. of sodium hydroxide solution 0.963 N is added within 5 minutes. The mixture is further stirred for 1¼ hour whereupon two layers are obtained the bottom layer of which is a viscous layer which is washed with water, diluted with methylene chloride and poured out into boiling water. The white flakes are dried at 110° C. and the polymer obtained has an intrinsic viscosity of 1.03 dl./g. in sym.-tetrachloroethane, and a film cast from methylene chloride solution shows a softening point of 158° C.

EXAMPLE 42

7.02 g. of 4,4'-diphenyl-disulfochloride (0.02 mol), 0.2 g. of triethylbenzyl ammonium chloride and 25 cc. of methylene chloride are successively brought into a three-necked 250 cc. flask provided with a stirrer and a dropping funnel. While stirring at room temperature a solution of 4.56 g. of 2,2-bis(4-hydroxyphenyl)-propane (0.02 mol) in 42 cc of sodium hydroxide solution 0.963 N is dropwise added within 10 minutes. At the same time a solution of 3.60 g. of 2,2-bis-(4-hydroxyphenyl)-propane-bis-chloroformate (0.0102 mol), 0.1 g. of triethylbenzyl ammonium chloride and 25 cc. of methylene chloride is brought into a second 250 cc. flask. Hereto is dropwise added within 10 minutes, and while stirring a solution of 2.28 g. of 2,2-bis-(4-hydroxyphenyl)-propane (0.01 mol) in 22 cc. of sodium hydroxide solution 0.963 N. Both mixtures are now separately stirred for 5 minutes. Thereafter the second flask content is added to the first and the whole is further stirred for 1¼ hour whereupon the supernatant water layer is decanted and the polymer residue washed with water and poured out into boiling water. The flakes are dried at 110° C. and the polymer obtained has an intrinsic viscosity of 1.10 dl./g. in sym.-tetrachloroethane, and a film cast from a methylene chloride solution shows a softening point of 157° C.

EXAMPLE 43

5.616 g. of 4,4'-diphenyl-disulfochloride (0.016 mol), 0.2 g. of triethylbenzyl ammonium chloride and 20 cc. of methylene chloride are successively brought into a three-necked 250 cc. of flask provided with a stirrer and a dropping funnel. While stirring at room temperature a solution consisting of 4.104 g. of 2,2-bis-(4-hydroxypenyl)-propane (0.018 mol) in 38.2 cc. of sodium hydroxide solution 0.963 N is dropwise added within 15 minutes. After further stirring for 5 minutes, a milky sticky mass is obtained whereupon a solution of 0.740 g. of 2,2-bis-(4-hydroxyphenyl)-propane-bis-chloroformate (0.0021 mol) in 10 cc. of methylene dichloride is added. Next the residual first sodium hydroxide solution is also rapidly added while the reaction mixture is further stirred for another one hour. The two layers obtained are separated and the bottom layer is washed with water, diluted with methylene chloride and poured out into boiling water. The soft flakes are dried at 110° C., and the polymer obtained has an intrinsic viscosity of 1.17 dl./g. in sym.-tetrachloroethane, and a film cast from a methylene chloride solution shows a softening point 155° C.

EXAMPLE 44

5.37 g. of 4,4'-diphenyl-disulfochloride (0.0153 mol), 0.3 g. of triethylbenzyl ammonium chloride, 15 cc. of methylene chloride, 6.977 g. of 2,2-bis-(4-hydroxyphenyl)-propane (0.0306 mol) and 66 cc. of sodium hydroxide solution 0.963 N are successively brought into a three-necked 250 cc. flask provided with a stirrer and a dropping funnel. While stirring at room temperature a solution of 2.92 g. of ethylene glycol-bis-chloroformate (0.0156 mol) in 10 cc. of methylene chloride is dropwise added within 15 minutes, and stirring is continued for another ½ hour. The bottom layer is separated, washed with water and poured out into boiling water. The flakes are dried at 110° C. and the polymer obtained has an intrinsic viscosity of 0.74 dl./g. in sym.-tetrachloroethane, and a film cast from methylene chloride solution shows a softening point of 115° C.

EXAMPLE 45

3.67 g. of 4,4'-diphenylether-disulfochloride (0.01 mol), 3.50 g. of 2,2-bis-(4-hydroxyphenyl)-propane-bis-chloroformate (0.0102 mol), 0.2 g. of triethylbenzyl ammonium chloride and 25 cc. of methylene chloride are successively brought into a three-necked 250 cc. flask provided with a stirrer and a dropping funnel. While stirring and at room temperature a solution of 4.56 g. of 2,2-bis-(4-hydroxyphenyl)-propane (0.2 mol) in 41.5 cc. of sodium hydroxide solution 0.963 N is dropwise added within 15 minutes, and stirring is continued for another 45 minutes. The two layers obtained are separated and the bottom layer is washed with water and then poured out into boiling water. The flakes are dried at 110° C. The polymer has an intrinsic viscosity of 0.87 dl./g. in sym.-tetrachloroethane and a film cast from a methylene chloride solution shows a softening point of 110° C.

EXAMPLE 46

2.75 g. of 1,3-benzene-disulfochloride (0.01 mole), 3.53 g. of 2,2-bis-(4-hydroxyphenyl)-propane-bis-chloroformate (0.01 mol), 0.2 g. of triethylbenzyl ammonium chloride and 25 cc. of methylene chloride are successively brought into a three-necked 250 cc. flask provided with a stirrer, and a dropping funnel. While stirring, a solution of 4.56 g. of 2,2-bis-(4-hydroxyphenyl)-propane (0.02 mol) and 41.5 cc. of sodium hydroxide solution 0.963 N is dropwise added within 10 minutes. Stirring is continued for another 40 minutes, the bottom layer is separated, washed with water and poured out into boiling water. The flakes are dried at 110° C. and the polymer obtained has an intrinsic viscosity of 0.66 dl./g. in sym.-tetrachloroethane, and a film cast from a methylene chloride solution shows a softening point of 105° C.

EXAMPLE 47

4.56 g. of 2,2-bis-(4-hydroxyphenyl)-propane (0.02 mol), 41.5 cc. of sodium hydroxide solution 0.963 N, 10 cc. of methylene chloride and 0.2 g. of triethylbenzyl ammonium chloride are successively added to a three-necked 250 cc. flask, provided with a stirrer and a dropping funnel. While stirring at room temperature a solution of 3.65 g. of 4,4'-diphenylmethane disulfochloride (0.01 mol), 3.57 g. of 2,2-bis-(4-hydroxyphenyl)-propane-bis-chloroformate (0.0101 mol) and 15 cc. of methylene chloride is dropwise added within 10 minutes. Stirring is continued for ½ hour whereafter the bottom layer is separated from the mixture, washed with water and then poured out into boiling water. The flakes are dried at 110° C. The polymer obtained has an intrinsic viscosity of 0.76 dl./g. in sym.-tetrachloroethane and a film cast from a methylene chloride solution shows a softening point of 115° C.

EXAMPLE 48

27.50 g. of 2,2-bis-(4-hydroxyphenyl)-propane (0.12 mol), 140 cc. of water, 13.70 g. of sodium hydroxide and 50 cc. of methylene chloride are successively brought into a three-necked 1 l. flask, provided with a thermometer, a gas inlet and a stirrer, and while stirring 14.13 g. of phosgene is added within 1½ hours at 20–25° C. Next, 42.12 g. of 4,4'-diphenyldisulfochloride (0.12 mol), 2.5 g. of triethylbenzyl ammonium chloride and 175 cc. of methylene chloride are added. While further stirring, a solution of 27.50 g. of 2,2-bis-(4-hydroxyphenyl)-propane (0.12 mol) and 9.8 g. of sodium hydroxide in 200 cc. of water is dropwise added within 10 minutes, and stirring is continued for another 1½ hours 200 cc. water are added to the mixture and stirring is continued for ¼ hr. The bottom layer is separated, washed with water and poured out into boiling water. The flakes are dried at 110° C. The polymer has an intrinsic viscosity of 0.4 dl./g. in sym.-tetrachloroethane.

EXAMPLE 49

3.5 g. of 4,4'-diphenyl-disulfochloride (0.01 mol) 3.56 g. of [2,2-bis-(4-hydroxyphenyl) - propane] - bis-chloroformate (0.0101 mol), 0.2 g. of triethylbenzyl ammonium chloride, 5.12 g. of bis-(4-hydroxy-3,5-dimethylphenyl)-diphenylmethane and 25 cc. of methylene chloride are successively brought into a three-necked 250 cc. flask provided with a stirrer and a dropping funnel. While stirring at room temperature 41.5 cc. of sodium hydroxide solution 0.963 N is dropwise added within 10 minutes, and stirring is continued for ½ hour. The two layers are separated whereupon the bottom layer is washed with water and poured out into boiling water. The flakes are dried at 110° C. The polymer obtained has an intrinsic viscosity of 0.42 dl./g. in sym.-tetrachloroethane.

EXAMPLE 50

27.5 g. of 2,2-bis-(4-hydroxyphenyl)-propane (0.12 mol), 11.70 g. of sodium hydroxide, 170 cc. of water, 100 cc. of methylene chloride and 1.2 g. of triethylbenzyl ammonium chloride are successively brought into a four-necked 0.5 l. flask, provided with a stirrer, a gas inlet and a thermometer. While stirring at 20–25° C., 7.15 g. of phosgene and 21.06 g. of 4,4'- diphenyldisulfochloride (0.06 mol) are dropwise added within 30 minutes to this mixture, and stirring is continued for 1½ hour. Two layers are obtained the bottom layer of which is viscous and is separated and washed with water. After dilution with 100 cc. of methylene chloride the product is poured out into boiling water. The flakes are dried at 110° C. The polymer obtained has an intrinsic viscosity of 0.72 dl./g. and a film cast from methylene chloride solution shows a good elongation at break and a softening point of 145° C.

EXAMPLE 51

7.02 g. of 4,4-diphenyl-disulfochloride (0.02 mol), 2.9 cc. of phthaloylchloride (0.02 mol), 0.4 g. of triethylbenzoyl ammonium chloride and 40 cc. of methylene chloride are successively brought into a three-necked 250 cc. flask, provided with a stirrer and a dropping funnel. While stirring at 0° C., a solution of 9.12 g. of 2,2-bis- (4-hydroxyphenyl)-propane (0.04 mol) into 84 cc. of sodium hydroxide solution 0.963 N is dropwise added through the dropping funnel within 10 minutes. After the addition of the bisphenate solution, the reaction mixture is stirred at room temperature for another 2 hours whereby the polymer separates as a viscous mass. The supernatant water is decanted and the residue washed two times with 50 cc. of water, whilst strongly stirring, whereupon the polymer layer is diluted with 50 cc. of methylene chloride. The product is obtained by pouring out the polymer solution in methanol, and drying the precipitate at 100° C. The intrinsic viscosity was measured in sym.-tetrachloroethane and found to be 0.70 dl./g. A film cast from a methylene chloride solution shows a softening temperature of 145° C.

EXAMPLE 52

7.02 g. of 4,4'-diphenyl-disulfochloride (0.02 mol), 0.2 g. of triethylbenzyl ammonium chloride, 1.6 g. of 5-pentadecyl resorcinol (0.005 mol) and 25 cc. of methylene chloride are successively brought into a three-necked 250 cc. flask, provided with a stirrer and a dropping funnel. While stirring at room temperature, a solution of 3.42 g. of 2,2-bis-(4-hydroxyphenyl)-propane (0.015 mol) and 41 cc. of sodium hydroxide solution 0.9905 N is dropwise added through the dropping funnel within 10 minutes. After the addition of the diphenol solution, the reaction mixture is stirred at room temperature for another 60 min. whereby the polymer separates as a viscous mass. The supernatant aqueous layer is decanted and the residue washed two times with 50 cc. of water, while strongly stirring, whereupon the polymer solution is diluted with 50 cc. of methylene chloride. The polymer is isolated by pouring out the polymer solution in ethanol, and drying the precipitate at 110° C. The intrinsic viscosity was measured in sym.-tetrachloroethane and found to be 1.45 dl./g.

EXAMPLE 53

To a three-necked 250 cc. flask provided with stirrer and dropping funnel are charged 4.56 g. (0.02 mol) of 2,2-bis-(4-hydroxyphenyl)-propane, 40 cc. of sodium hydroxide 1 N (0.04 mol), 200 mg. of triethylbenzyl ammonium chloride and 10 cc. of methylene chloride, and within 5 minutes a solution of 3.05 cc. of benzoylchloride-m-sulfochloride is added in 10 cc. of methylene chloride. After rinsing the funnel with 5 cc. of methylene chloride stirring is continued for another 1 hour. During the polycondensation the reaction mixture separates into two layers, and the supernatant water is decanted from the very viscous organic layer obtained. After washing the organic layer with water the polymer is precipitated by pouring out into boiling water. The flakes obtained are then dried at 110° C. Yield: 7.5 g. The intrinsic viscosity determined in tetrachloroethane amounts to 0.9 dl./g.

The polymer obtained has the following formula:

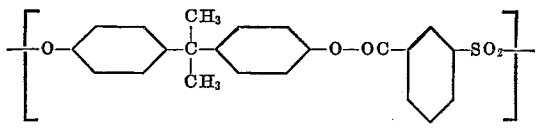

What we claim is:

1. A process of preparing a high molecular weight linear polyester of a polybasic acid and a polyhydric compound, said polybasic acid consisting essentially of at least one acid selected from the group consisting of aromatic disulfonic acids and aromatic monocarboxysulfonic acids, and said polyhydric compound consisting essentially of at least one bis-phenolic compound selected from the group consisting of the following formulae:

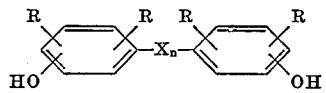

where $n$ is an integer from 0 to 1, each R is selected from the group consisting of hydrogen, alkyl and halogen, and X is selected from the group consisting of

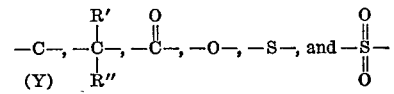

Y representing the atoms necessary to close a lower cycloaliphatic ring and R' and R" each representing a member of the group consisting of hydrogen, alkyl, haloalkyl, a phenyl radical, and a cycloalkyl radical, alkyl in all instances being lower alkyl and halo- and halogen in all instances being a halogen atom of atomic weight less than 100; and HO—Ar—OH where Ar is a member of the group consisting of a phenyl radical and a naphthalene radical; said method comprising the steps of agitating a solution of a dihalide of such acid in a liquid halogenated hydrocarbon which is a solvent for the resultant polyester in contact with a solution of an alkali metal alcoholate of such bis-phenolic compound in a liquid immiscible with said liquid hydrocarbon, in the presence of a catalyst of the group consisting of a quaternary ammonium compound, a quaternary arsonium compound, a quaternary phosphonium compound, and a tertiary sulfonium compound, and recovering from liquid hydrocarbon the resultant polyester having an intrinsic viscosity of at least about 0.5 dl./g. measured in sym.-tetrachloroethane at 25° C.

2. The process of claim 1 wherein said acid is a member of the group consisting of Z—Ar—SO$_3$H where Ar is a member of the group consisting of a phenyl radical and a naphthalene radical, and

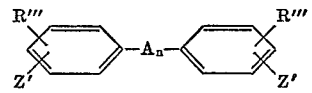

where $n$ is an integer from 0 to 1, R''' is a member of the group consisting of hydrogen, halogen and alkyl, Z and Z' each is a member of the group consisting of a sulfonic acid group and a carboxylic acid group and at least one Z' is a sulfonic acid group, and A is a divalent radical of the group consisting of oxygen, sulfone, and lower alkylene.

3. A process as claimed in claim 1, wherein said solution of the dihalide of said acid selected from the group consisting of aromatic disulfonic acids and aromatic carboxysulfonic acids also contains the dihalide of an aromatic dicarboxylic acid.

4. The process of claim 1 in which the condensation is carried out in the presence of a catalytic amount of a quaternary ammonium compound.

5. Process for the preparation of a highly polymeric linear polyester having an intrinsic viscosity of at least 0.4 when measured in a solution in sym.-tetrachloroethane at 25° C., which comprises condensing at least one diacid halide dissolved in an organic liquid which is water-immiscible and is a solvent for the polyester product, with an aqueous solution of at least one alkali metal salt of a bis-phenol, in the presence of a catalyst of the group consisting of a quaternary ammonium compound, a quaternary phosphonium compound, a quaternary arsonium compound, and a tertiary sulfonium compound, the diacid halide having the general formulae:

halogen—R'—D—SO$_2$—halogen in which R' is a member selected from the group consisting of SO$_2$ and CO; and D is a divalent radical selected from the group consisting of phenylene, tolylene, naphthylene, diphenylene, diphenylenemethane, diphenylene ether, and diphenylene sulfone; said bis-phenol having the general formula HO—Z—OH, in which Z is a divalent radical selected from the group consisting of phenylene, tolylene, chlorphenylene, diphenylene, naphthylene, and

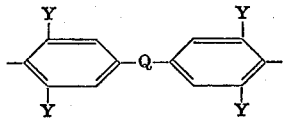

in which Q is a divalent radical selected from the group consisting of $SO_2$, SO, S, CO, lower alkylene, monophenylmethylene, diphenylmethylene, monophenylmono(lower alkyl) methylene, di(lower alkyl) methylene, and a cycloaliphatic ring in which both free valences are attached to the same carbon atom of the cycloaliphatic ring; and Y is a member selected from the group consisting of H, $CH_3$, Cl, Br and F.

References Cited
UNITED STATES PATENTS

| | | | |
|---|---|---|---|
| 2,035,578 | 3/1936 | Wagner | 260—2 |
| 2,708,617 | 5/1955 | Magat et al. | 18—54 |
| 3,028,364 | 4/1962 | Conix et al. | 260—47 |

WILLIAM H. SHORT, Primary Examiner

L. L. LEE, Assistant Examiner

U.S. Cl. X.R.

260—47 C